(12) United States Patent
Ozawa

(10) Patent No.: US 7,756,596 B2
(45) Date of Patent: Jul. 13, 2010

(54) SYSTEM, APPARATUS, METHOD, RECORDING MEDIUM AND COMPUTER PROGRAM FOR PROCESSING INFORMATION

(75) Inventor: Takeshi Ozawa, Chiba (JP)

(73) Assignee: Sony Corporation, Tokyo (JP)

( * ) Notice: Subject to any disclaimer, the term of this patent is extended or adjusted under 35 U.S.C. 154(b) by 884 days.

(21) Appl. No.: 11/582,992

(22) Filed: Oct. 19, 2006

(65) Prior Publication Data
US 2007/0116317 A1 May 24, 2007

(30) Foreign Application Priority Data
Nov. 8, 2005 (JP) .............................. 2005-323152

(51) Int. Cl.
*G06F 17/00* (2006.01)
(52) U.S. Cl. ..................................................... 700/94
(58) Field of Classification Search ................. 700/94; 455/3.06, 563; 704/270, 270.1, 275, 233, 704/236, 104.1
See application file for complete search history.

(56) References Cited

U.S. PATENT DOCUMENTS

| | | | |
|---|---|---|---|
| 7,174,293 B2 * | 2/2007 | Kenyon et al. ............... 704/231 |
| 2004/0006737 A1 * | 1/2004 | Colbath et al. ........... 715/500.1 |
| 2004/0260682 A1 * | 12/2004 | Herley et al. ..................... 707/3 |
| 2006/0148528 A1 * | 7/2006 | Jung et al. .................... 455/566 |
| 2006/0235864 A1 * | 10/2006 | Hotelling et al. ............. 707/101 |
| 2007/0143777 A1 * | 6/2007 | Wang ............................ 725/18 |
| 2007/0150930 A1 * | 6/2007 | Koivisto et al. .............. 725/134 |
| 2008/0154932 A1 * | 6/2008 | Kobayashi et al. ........... 707/102 |
| 2009/0100990 A1 * | 4/2009 | Cremer et al. ................. 84/623 |

FOREIGN PATENT DOCUMENTS

| | | |
|---|---|---|
| JP | 08-315548 | 11/1996 |
| JP | 2001-125914 | 5/2001 |
| JP | 2002-142177 | 5/2002 |
| JP | 2003-032662 | 1/2003 |
| JP | 2003-330954 | 11/2003 |
| JP | 2004-228751 | 8/2004 |
| JP | 2004-294584 | 10/2004 |
| JP | 2005-148801 | 6/2005 |
| JP | 2005-276375 | 10/2005 |
| WO | WO 2005066961 A1 * | 7/2005 |

* cited by examiner

*Primary Examiner*—Andrew C Flanders
(74) *Attorney, Agent, or Firm*—Oblon, Spivak, McClelland, Maier & Neustadt, L.L.P.

(57) ABSTRACT

An information processing apparatus includes a data acquisition unit for acquiring data containing at least audio data, a recording unit for recording the data, an output unit for outputting the data, an operation input acquisition unit for acquiring an operation input when the output unit outputs the data, a setting unit for setting bookmark information mapped to the data, the bookmark information indicating a position of the data that is output from the output unit at the moment the operation input acquisition unit acquires the operation input, and a supplying controller for controlling supplying of the first data and the bookmark information to another apparatus.

20 Claims, 17 Drawing Sheets

SYSTEM, APPARATUS, METHOD, RECORDING MEDIUM AND COMPUTER PROGRAM FOR PROCESSING INFORMATION

CROSS REFERENCES TO RELATED APPLICATIONS

The present invention contains subject matter related to Japanese Patent Application JP 2005-323152 filed in the Japanese Patent Office on Nov. 8, 2005, the entire contents of which are incorporated herein by reference.

BACKGROUND OF THE INVENTION

1. Field of the Invention

The present invention relates to a system, apparatus, recording medium, method and computer program for processing information. More particularly, the present invention relates to a system, apparatus, recording medium, method, and computer program appropriate for use in receiving broadcast signals.

2. Description of the Related Art

Searching for data in databases accumulated in a computer system is a widely accepted practice. A database system performs a search process in response to a keyword input by a user, and provides the user with search results. If the search results provided by the database system to the user are numerous, the user can narrow search by further entering another keyword on the provided information.

The user may like a song in radio-broadcasting and want to obtain information relating to the song. The user may then search for the song using a music database. More specifically, the user searches for the song with a keyword set based on incidental information broadcast together with the song. The incidental information may include the name of the song, the name of an artist playing the song, etc., possibly told by an announcer.

To use the music database, the user cannot obtain desirable results if an appropriate keyword is not input. For example, the user may fail to hear the incidental information such as the name of the song and the name of the artist, and cannot enter an appropriate keyword in the search. In such a case, the user cannot obtain desired information. Japanese Unexamined Patent Application Publication No. 2001-125914 discloses a technique that allows the user to search for a broadcast content without an appropriate keyword. In accordance with this technique, when the user likes a song being broadcast, search conditions are set on a search engine. The search conditions include a broadcasting station broadcasting the song, a place of the broadcasting station, and time of broadcasting. The search engine searches database in accordance with the set search conditions, outputs, as a search result, the name of the song, a name of an album containing the song, a selling agency of the album, and artist information.

In another service, the user may transmit as music data a portion of a song to a server, and the server then compares a feature quantity of transmitted music data with a feature quantity of music data registered on the database thereof, and then provides as search results a name of the song identified by the music data provided by the user.

SUMMARY OF THE INVENTION

The user may like a song being radio-broadcast, and may want to record the song solely or together with video, for personal fun. In such a case, the user individually associate recording, acquired information of the recorded song, recorded data, and information relating to the acquired song.

It is thus desirable to organize recorded audio data and recorded video data after a broadcast content such as a song is recorded solely or together with video.

In accordance with one embodiment of the present invention, an information processing system includes a first apparatus for acquiring first data containing at least audio data and a second apparatus for exchanging information with the first apparatus. The first apparatus includes a data acquisition unit for acquiring the first data, a recording unit for recording the first data, an output unit for outputting the first data, an operation input acquisition unit for acquiring an operation input, a setting unit for setting bookmark information mapped to the first data, the bookmark information indicating a position of the first data that is output from the output unit at the moment the operation input acquisition unit acquires the operation input, and a first supplying controller for controlling supplying of the first data and the bookmark information to the second apparatus. The second apparatus includes a first acquisition controller for controlling acquisition of the first data and the bookmark information, an analyzer for extracting a music portion of the first data by analyzing the first data, and extracting, as second data, part of the music portion of the first data with the bookmark information mapped thereto, a second acquisition controller for controlling acquisition of metadata corresponding to the second data, and a recording controller for controlling recording of the second data and the metadata with the second data mapped to the metadata.

The second apparatus may further include a link information generator for generating link information linking the second data and the metadata.

The second apparatus may further include a second supplying controller for controlling supplying of the second data, the metadata, and the link information to the first apparatus.

The first apparatus may further include a third acquisition controller for controlling acquisition of the second data, the metadata, and the link information, a link information recording controller for controlling recording of the link information, an information recording controller for controlling recording of the second data and the metadata, and a playing controller for controlling playing of the second data.

The first apparatus may further include a storage unit for storing the first data for a predetermined period of time, and an analysis information recording controller for controlling the recording unit to start to record the first data at the moment the operation input acquisition unit acquires the operation input and continue to record the first data for a predetermined period of time.

The bookmark information may include relative time information from the start of the recording of the first data.

The bookmark information may include flag information indicating the position of the first data that is output by the output unit at the moment the operation input acquisition unit acquires the operation input.

The second acquisition controller in the second apparatus may control supplying of information containing a feature quantity of a portion of the second data to a predetermined server while controlling acquisition of metadata corresponding to the second data from the server.

The second acquisition controller in the second apparatus may control supplying of information containing a portion of the second data to a predetermined server while controlling acquisition of metadata corresponding to the second data from the server.

The second acquisition controller in the second apparatus may control supplying of information containing broadcast time information of the second data to a predetermined server while controlling acquisition of metadata corresponding to the second data from the server.

The second acquisition controller in the second apparatus may control supplying of information containing broadcasting station information of the second data to a predetermined server while controlling acquisition of metadata corresponding to the second data from the server.

The second acquisition controller in the second apparatus may control supplying of information containing information relating to a broadcast coverage area of the second data to a predetermined server while controlling acquisition of metadata corresponding to the second data from the server.

In accordance with another embodiment of the present invention, an information processing method of an information processing system including a first apparatus for acquiring first data containing at least audio data and a second apparatus for exchanging information with the first apparatus, includes, through the first apparatus, a data acquisition step of acquiring the first data, a recording step of recording the first data acquired in the data acquisition step, an output step of outputting the first data acquired in the data acquisition step, an operation input acquisition step of acquiring an operation input when the first data is output in the output step, a bookmark information setting step of setting bookmark information mapped to the first data, the bookmark information indicating a position of the first data that is output in the output step at the moment the operation input is acquired in the operation input acquisition step, and a supply step of supplying to the second apparatus the first data and the bookmark information with the first data and the bookmark information mapped to each other in the bookmark information setting step, and through the second apparatus, a data acquisition step of acquiring the first data and the bookmark information from the first apparatus, the bookmark information representing timing at which the first apparatus receives the operation input during the output of the first data, an analyzing step of extracting a music portion of the first data by analyzing the first data acquired in the data acquisition step, and extracting, as second data, part of the music portion of the first data with the bookmark information mapped thereto, a metadata acquisition step of acquiring metadata corresponding to the second data analyzed and extracted in the analyzing step, and a recording step of recording the analyzed and extracted second data and the acquired metadata with the second data mapped to the metadata.

In accordance with another embodiment of the present invention, an information processing apparatus includes a data acquisition unit for acquiring data containing at least audio data, a recording unit for recording the data, an output unit for outputting the data, an operation input acquisition unit for acquiring an operation input when the output unit outputs the data, a setting unit for setting bookmark information mapped to the data, the bookmark information indicating a position of the data that is output from the output unit at the moment the operation input acquisition unit acquires the operation input, and a supplying controller for controlling supplying of the data and the bookmark information to another apparatus.

In accordance with one embodiment of the present invention, a recording medium stores a computer program. The computer program includes a data acquisition step of acquiring the first data containing at least audio data, a recording step of recording the first data acquired in the data acquisition step, an output step of outputting the first data acquired in the data acquisition step, an operation input acquisition step of acquiring an operation input when the first data is output in the output step, a bookmark information setting step of setting bookmark information mapped to the first data, the bookmark information indicating a position of the first data that is output in the output step at the moment the operation input is acquired in the operation input acquisition step, and a supply step of supplying to the second apparatus the first data and the bookmark information with the first data and the bookmark information mapped to each other in the bookmark information setting step.

In accordance with one embodiment of the present invention, an information processing apparatus includes a first acquisition controller for controlling acquisition of first data acquired by another apparatus and containing at least audio data, and bookmark information as information indicating timing the other apparatus receives an operation input when the first data is output, an analyzer for extracting a music portion of the first data by analyzing the first data, and extracting, as second data, part of the music portion of the first data with the bookmark information mapped thereto, a second acquisition controller for controlling acquisition of metadata corresponding to the second data, and a recording controller for controlling recording of the second data and the metadata with the second data mapped thereto.

In accordance with one embodiment of the present invention, a recording medium stores a computer program. The computer program includes a data acquisition step of controlling acquisition of first data supplied by another apparatus, and bookmark information as information indicating timing the other apparatus receives an operation input when the first data is output, an analysis step of extracting a music portion of the first data acquired in the data acquisition step by analyzing the first data, and extracting, as second data, part of the music portion of the first data with the bookmark information mapped thereto, a metadata acquisition step of controlling acquisition of metadata corresponding to the second data that is analyzed and extracted in the analysis step, and a recording step of controlling recording of the analyzed and extracted second data and the acquired metadata with the second data mapped to the metadata.

In accordance with one embodiment of the present invention, an information processing apparatus includes a data acquisition unit for acquiring first data containing at least audio data, a recording unit for recording the first data, an output unit for outputting the first data, an operation input acquisition unit for acquiring an operation input when the output unit outputs the first data, a setting unit for setting bookmark information mapped to the first data, the bookmark information indicating a position of the first data that is output from the output unit at the moment the operation input acquisition unit acquires the operation input, an analyzer for extracting a music portion of the first data by analyzing the first data, and extracting, as second data, part of the music portion of the first data with the bookmark information mapped thereto, a acquisition controller for controlling acquisition of metadata corresponding to the second data, and a recording controller for controlling recording of the second data and the metadata with the second data mapped to the metadata.

In accordance with one embodiment of the present invention, a recording medium stores a computer program. The computer program includes a data acquisition step of acquiring first data containing at least audio data, a recording step of recording the first data acquired in the data acquisition step, an output step of outputting the first data acquired in the data acquisition step, an operation input acquisition step of acquiring an operation input in response to the outputting of the first data in the output step, a bookmark information setting step of setting bookmark information mapped to the first data, the bookmark information indicating a position of the first data that is output at the moment the operation input is acquired in the operation input acquisition step, an analyzing step of extracting a music portion of the first data by analyzing the first data, and extracting, as second data, part of the music portion of the first data with the bookmark information mapped thereto in the bookmark information setting step, a metadata acquisition step of controlling acquisition of metadata corresponding to the second data analyzed and extracted in the analyzing step, and an analysis data recording step of controlling recording of the second data analyzed and extracted in the analyzing step and the metadata acquired in the metadata acquisition step with the second data mapped to the metadata.

In accordance with embodiments of the present invention, the first apparatus acquires the first data, records the first acquired data, and outputs the first acquired data. The operation input is acquired when the first data is output. The bookmark information indicating the position of the first data that is output at the moment the operation input is acquired is mapped to the first data. The first data and the bookmark information mapped to the first data are supplied to the second apparatus. The second apparatus acquires the first data and the bookmark information. The acquired first data is analyzed to extract the music portion. The part of the music portion of the first data mapped to the bookmark information is extracted as the second data. The metadata corresponding to the second data analyzed and extracted is acquired. The second data analyzed and extracted is mapped to the acquired metadata, and the second data and the metadata mapped thereto are then recorded.

In accordance with embodiments of the present invention, the data containing at least audio data is acquired. The acquired data is output. The operation input is acquired when the data is output. The bookmark information indicating the position of the data that is output at the moment the operation input is acquired is mapped to the data. The data and the bookmark information mapped to the data are supplied to the other apparatus.

In accordance with embodiments of the present invention, the first data and the bookmark information indicating timing the operation input is received during the output of the first data are acquired from the other apparatus. The acquired first data is analyzed to extract the music portion thereof. The part of the music portion of the first data mapped to the bookmark information is extracted as the second data. The metadata corresponding to the analyzed and extracted second data is acquired. The second data and the metadata are then recorded with one data mapped to the other data.

In accordance with embodiments of the present invention, the first data is recorded, and the acquired first data is output. The operation input is acquired during the output of the first data. The bookmark information indicating the position of the first data that is output at the moment the operation input is acquired is mapped to the first data. The recorded first data is analyzed to extract the music portion. The part of the music portion of the first data mapped to the bookmark information is extracted as the second data. The metadata corresponding to the second data is extracted. The second data and the metadata are recorded with one data mapped to the other data.

The word network refers to a mechanism that includes at least two apparatuses connected to each other to allow one apparatus to transfer information to the other apparatus. Each of apparatuses communicating with each other via the network may be an independent apparatus or an internal block constructing the apparatus.

The word communication herein may be wireless communication, wired communication, or a combination of the wireless communication and the wired communication. In the case of the combination of wireless communication and wired communication, wireless communication may be performed in one area and wired communication may be performed in the other area. Furthermore, wired communication is performed from a first apparatus to a second apparatus, and then wireless communication is performed from the second apparatus to a third apparatus.

A recording apparatus may be an independent apparatus or a block performing a recording process in a broadcast receiving terminal or a recording and playing apparatus.

A user can thus acquire and record data. The user can set a bookmark in the recorded data, extract the music portion, and acquire the metadata. The user can thus easily arrange data containing audio in order in the recording process.

The user can acquire and record the data. In particular, the user can set the bookmark in the recorded data. The data with the bookmark set therewithin can be supplied to the other apparatus for analysis.

The data can be analyzed. The data with the bookmark set therewithin can be supplied for analysis.

DESCRIPTION OF THE PREFERRED EMBODIMENTS

Figure 1:
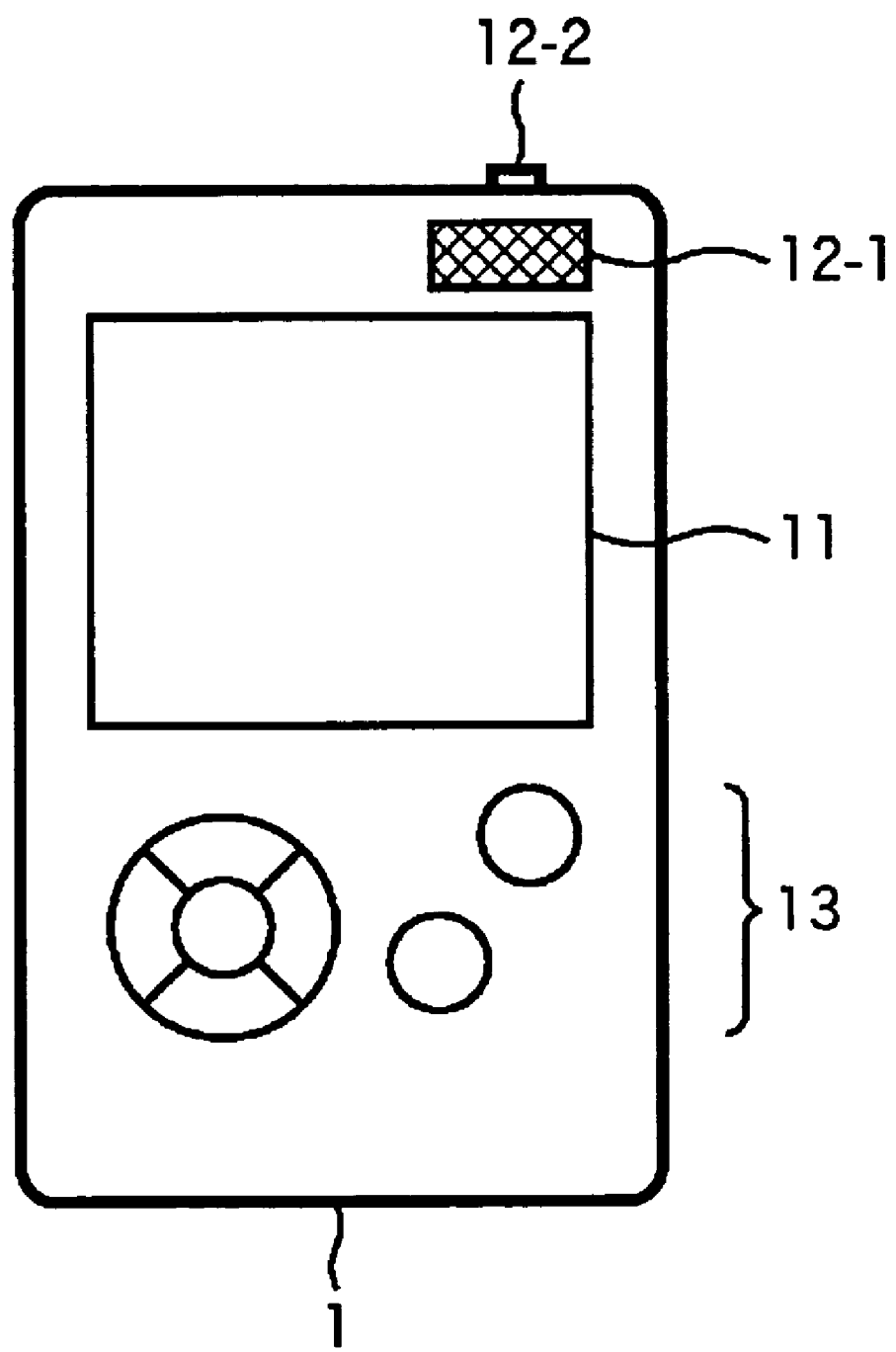
FIG. 1 is an external view of a broadcast receiving terminal in accordance with one embodiment of the present invention.

The embodiments of the present invention are described below. The description herein assures that the embodiments supporting the present invention are described in the specification and the drawings. Even if an embodiment is described in the specification and the drawings but not described as constituting the subject matter of the present invention, that does not mean that that embodiment fails to constitute the subject matter. Conversely, if an embodiment is described herein as constituting the subject matter, that does not necessarily mean that the embodiment fails to constitute another subject matter.

In accordance with one embodiment of the present invention, an information processing system includes a first apparatus (for example, broadcast receiving terminal 1) for acquiring first data containing at least audio data and a second apparatus (for example, personal computer 51) for exchanging information with the first apparatus. The first apparatus includes a data acquisition unit (for example, antenna 24 of FIG. 2 or 13) for acquiring the first data, a recording unit (for example, data memory 27 of FIG. 2 or 13) for recording the first data, an output unit (for example, audio output unit 12 of FIG. 2 or 13) for outputting the first data, an operation input acquisition unit (for example, operation input acquisition unit 31 of FIG. 3 or 14) for acquiring an operation input, a setting unit (for example, bookmark setter 35 of FIG. 3 or 14) for setting bookmark information mapped to the first data, the bookmark information indicating a position of the first data that is output from the output unit at the moment the operation input acquisition unit acquires the operation input, and a first supplying controller (for example, communication interface 28 of FIG. 2 or 13 and unanalyzed data output unit 37 of FIG. 3 or 14) for controlling supplying of the first data and the bookmark information to the second apparatus. The second apparatus includes a first acquisition controller (for example, unanalyzed data acquisition control unit 101 of FIG. 9) for controlling acquisition of the first data and the bookmark information, an analyzer (for example, data analysis processor 102 of FIG. 9) for extracting a music portion of the first data by analyzing the first data, and extracting, as second data (for example, a music portion with the bookmark mapped thereto), part of the music portion of the first data with the bookmark information mapped thereto, a second acquisition controller (for example, metadata acquisition control unit 103 of FIG. 9) for controlling acquisition of metadata corresponding to the second data, and a recording controller (for example, database organizer 104 of FIG. 9) for controlling recording of the second data and the metadata with the second data mapped to the metadata.

The second apparatus may further include a link information generator (for example, bookmark list generator 105 of FIG. 9) for generating link information linking the second data extracted by the analyzer and the metadata acquired under the control of the second acquisition controller.

The second apparatus may further include a second supplying controller (for example, analyzed data supply control unit 106 of FIG. 9) for controlling supplying of the second data extracted by the analyzer, the metadata acquired under the control of the second acquisition controller, and the link information generated by the link information generator to the first apparatus.

The first apparatus may further include a third acquisition controller (for example, data acquisition control unit 41 of FIG. 3 or 14) for controlling acquisition of the second data supplied under the control of the second supplying controller in the second apparatus, the metadata, and the link information, a link information recording controller (for example, bookmark list manager 38 of FIG. 3 or 14) for controlling recording of the link information acquired under the control of the third acquisition controller, an information recording controller (for example, metadata and music data manager 39 of FIG. 3 or 14) for controlling recording of the second data acquired under the control of the third acquisition controller and the metadata, and a playing controller (for example, music data playing control unit 40 of FIG. 3 or 14) for controlling playing of the second data recorded under the control of the information recording controller.

The first apparatus may further include a storage unit (for example, data buffer 112 of FIG. 13) for storing the first data for a predetermined period of time, and an analysis information recording controller for controlling the recording unit to start to record the first data at the moment the operation input acquisition unit acquires the operation input and continue to record the first data for a predetermined period of time.

An information processing method of an information processing system including a first apparatus for acquiring first data containing at least audio data and a second apparatus for exchanging information with the first apparatus, includes, through the first apparatus, a data acquisition step (for example, step S3 of FIG. 10) of acquiring the first data, a recording step (for example, step S4 of FIG. 10) of recording the first data acquired in the data acquisition step, an output step (for example, step S6 of FIG. 10) of outputting the first data acquired in the data acquisition step, an operation input acquisition step (for example, step S7 of FIG. 10) of acquiring an operation input when the first data is output in the output step, a bookmark information setting step (for example, step S8 of FIG. 10) of setting bookmark information mapped to the first data, the bookmark information indicating a position of the first data that is output in the output step at the moment the operation input is acquired in the operation input acquisition step, and a supply step of supplying to the second apparatus the first data and the bookmark information with the first data and the bookmark information mapped to each other in the bookmark information setting step, and, through the second apparatus, a data acquisition step (for example, step S41 of FIG. 11) of acquiring the first data and the bookmark information from the first apparatus, the bookmark information representing timing at which the first apparatus receives the operation input during the output of the first data, an analyzing step (for example, step S45 of FIG. 11) of extracting a music portion of the first data by analyzing the first data acquired in the data acquisition step, and extracting, as second data (for example, a music portion with the bookmark mapped thereto), part of the music portion of the first data with the bookmark information mapped thereto, a metadata acquisition step (for example, step S47 of FIG. 11) of acquiring metadata corresponding to the second data analyzed and extracted in the analyzing step, and a recording step (for example, step S48 of FIG. 11) of recording the analyzed and extracted second data and the acquired metadata with the second data mapped to the metadata.

A computer program causes a computer to control a first apparatus in an information processing system including the first apparatus for acquiring first data containing at least audio data and a second apparatus for exchanging information with the first apparatus, and includes a data acquisition step (for example, step S3 of FIG. 10) of acquiring the first data containing at least audio data, a recording step (for example, step S4 of FIG. 10) of recording the first data acquired in the data acquisition step, an output step (for example, step S6 of FIG. 10) of outputting the first data acquired in the data acquisition step, an operation input acquisition step (for example, step S7 of FIG. 10) of acquiring an operation input when the first data is output in the output step, a bookmark information setting step (for example, step S8 of FIG. 10) of setting bookmark information mapped to the first data, the bookmark information indicating a position of the first data that is output in the output step at the moment the operation input is acquired in the operation input acquisition step, and a supply step of supplying to the second apparatus the first data and the bookmark information with the first data and the bookmark information mapped to each other in the bookmark information setting step.

A computer program causes a computer to control a second apparatus in an information processing system including a first apparatus for acquiring first data containing at least audio data and the second apparatus for exchanging information with the first apparatus, and includes a data acquisition step (for example, step S41 of FIG. 11) of controlling acquisition of first data supplied by another apparatus, and bookmark information as information indicating timing the other apparatus receives an operation input when the first data is output, an analysis step (for example, step S45 of FIG. 11) of extracting a music portion of the first data acquired in the data acquisition step by analyzing the first data, and extracting, as second data (for example, a music portion with the bookmark mapped thereto), part of the music portion of the first data with the bookmark information mapped thereto, a metadata acquisition step (for example, step S47 of FIG. 11) of controlling acquisition of metadata corresponding to the second data that is analyzed and extracted in the analysis step, and a recording step (for example, step S48 of FIG. 11) of controlling recording of the analyzed and extracted second data and the acquired metadata with the second data mapped to the metadata.

In accordance with one embodiment of the present invention, an information processing apparatus (for example, broadcast receiving terminal 1) for acquiring data containing at least audio data, includes a data acquisition unit (for example, antenna 24 of FIG. 2 or 13) acquiring data containing at least audio data, a recording unit (for example, data memory 27 of FIG. 2 or 13) for recording the data, an output unit (for example, audio output unit 12 of FIG. 2 or 13) for outputting the data, an operation input acquisition unit (for example, operation input acquisition unit 31 of FIG. 3 or 14) for acquiring an operation input when the output unit outputs the data, a setting unit (for example, bookmark setter 35 of FIG. 3 or 14) for setting bookmark information mapped to the data, the bookmark information indicating a position of the data that is output from the output unit at the moment the operation input acquisition unit acquires the operation input, and a supplying controller (for example, communication interface 28 of FIG. 2 or 13 and unanalyzed data output unit 37 of FIG. 3 or 14) for controlling supplying of the data and the bookmark information to another apparatus.

Figure 9:
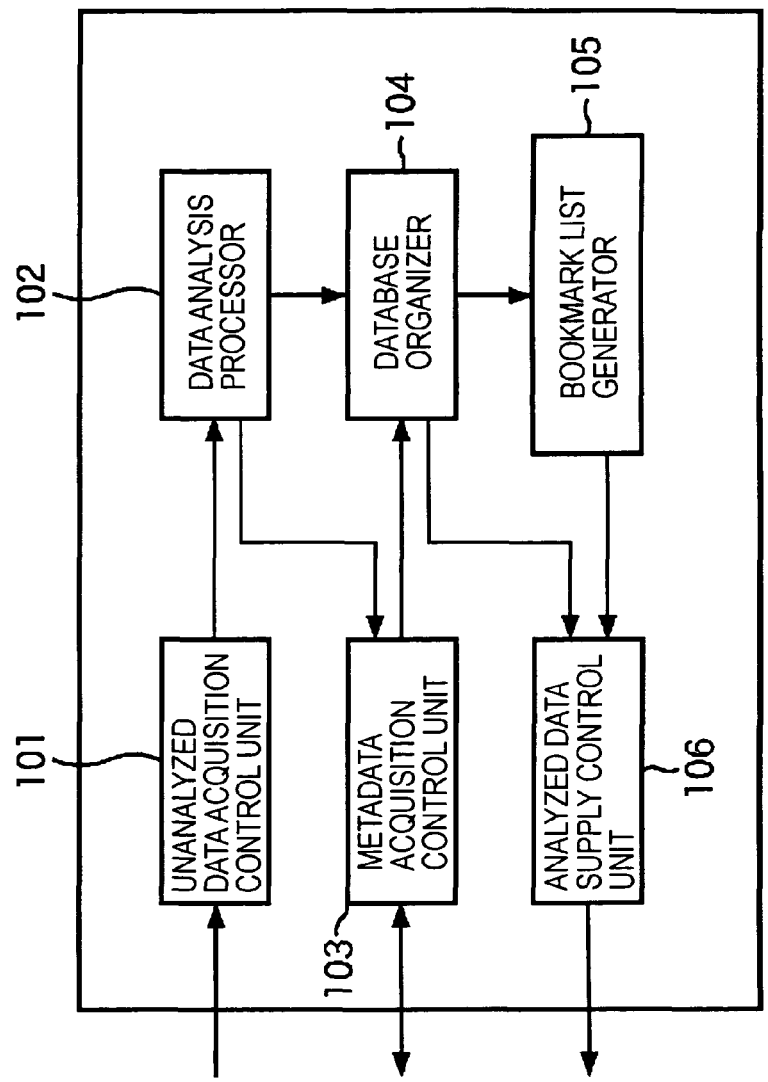
FIG. 9 is a functional block diagram of a CPU of FIG. 8.

In accordance with one embodiment of the present invention, an information processing apparatus (for example, personal computer 51) for analyzing first data, containing at least audio data, acquired by another apparatus, includes a first acquisition controller (for example, unanalyzed data acquisition control unit 101 of FIG. 9) for controlling acquisition of first data acquired by another apparatus and containing at least audio data, and bookmark information as information indicating timing the other apparatus receives an operation input when the first data is output, an analyzer (for example, data analysis processor 102 of FIG. 9) for extracting a music portion of the first data by analyzing the first data, and extracting, as second data (for example, a music portion with the bookmark mapped thereto), part of the music portion of the first data with the bookmark information mapped thereto, a second acquisition controller (for example, metadata acquisition control unit 103 of FIG. 9) for controlling acquisition of metadata corresponding to the second data, and a recording controller (for example, database organizer 104 of FIG. 9) for controlling recording of the second data and the metadata with the second data mapped thereto.

In accordance with one embodiment of the present invention, an information processing apparatus (for example, personal computer 151 of FIG. 16) for acquiring first data containing at least audio data, includes a data acquisition unit (for example, antenna 24 of FIG. 16) for acquiring first data containing at least audio data, a recording unit (for example, recording unit 76 of FIG. 16) for recording the first data, an output unit (for example, output unit 61 of FIG. 16) for outputting the first data, an operation input acquisition unit (for example, operation input acquisition unit 31 of FIG. 17) for acquiring an operation input when the output unit outputs the first data, a setting unit (for example, bookmark setter 35 of FIG. 17) for setting bookmark information mapped to the first data, the bookmark information indicating a position of the first data that is output from the output unit at the moment the operation input acquisition unit acquires the operation input, an analyzer (for example, data analysis processor 102 of FIG. 17) for extracting a music portion of the first data by analyzing the first data, and extracting, as second data (for example, a music portion with the bookmark mapped thereto), part of the music portion of the first data with the bookmark information mapped thereto, an acquisition controller (for example, metadata acquisition control unit 103 of FIG. 17) for controlling acquisition of metadata corresponding to the second data, and a recording controller (for example, database organizer 104 of FIG. 17) for controlling recording of the second data and the metadata with the second data mapped to the metadata.

The embodiments of the present invention are described below with reference to the drawings.

FIG. 1 is an external view of a broadcast receiving terminal 1 in accordance with one embodiment of the present invention.

The broadcast receiving terminal 1 includes a display 11, an audio output unit 12 composed of a loudspeaker 12-1 and an earphone jack 12-1, and an operation input unit 13. The broadcast receiving terminal 1 receives and plays radio broadcast signals and television broadcast signals. The broadcast receiving terminal 1 is preferably sized to be easily held and carried with one hand of a user.

Figure 2:
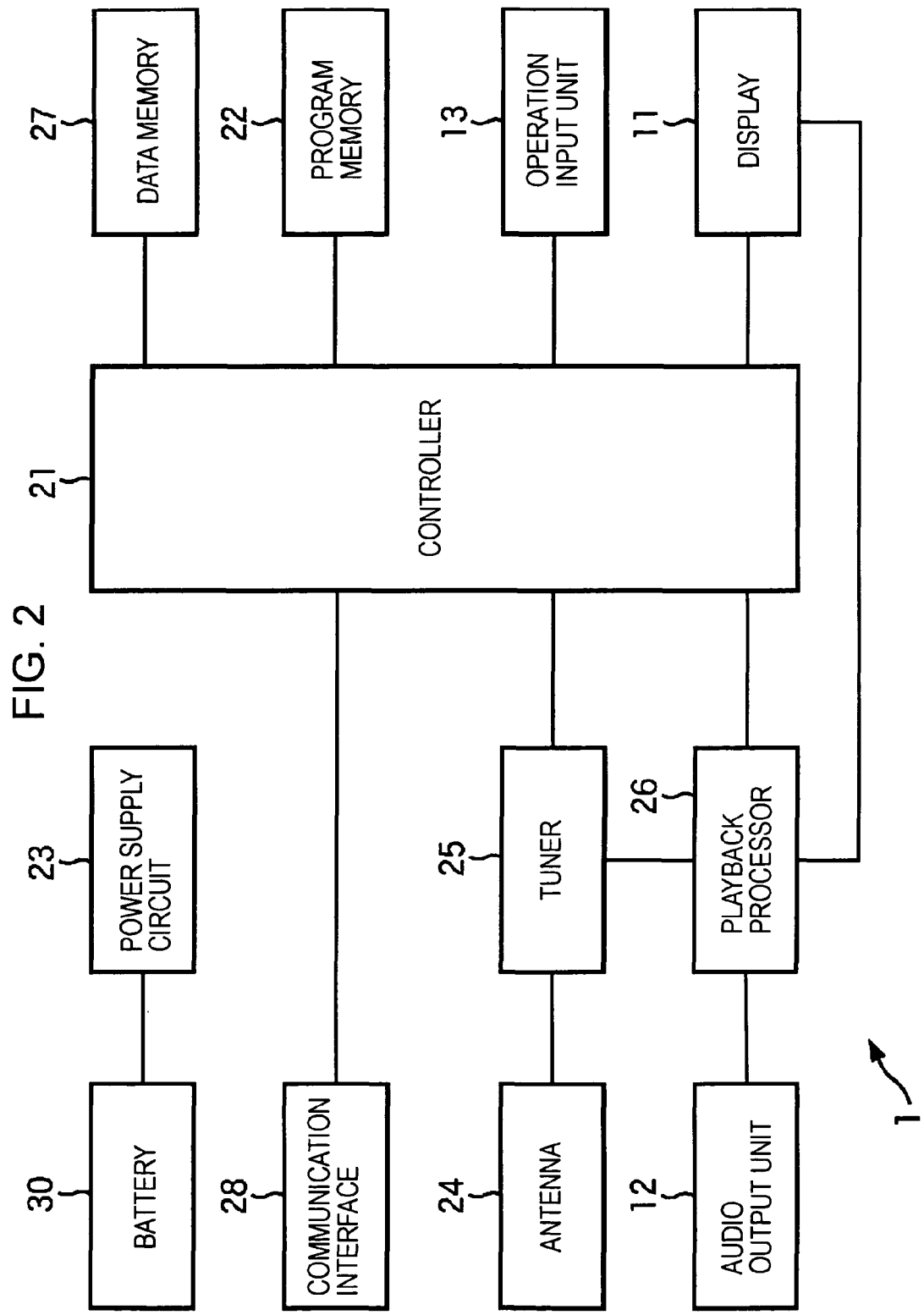
FIG. 2 is a block diagram illustrating a configuration of the broadcast receiving terminal of FIG. 1.

FIG. 2 is a block diagram illustrating a configuration of the broadcast receiving terminal 1 of FIG. 1.

The broadcast receiving terminal 1 includes a controller 21, a program memory 22, a power supply circuit 23, the display 11, the audio output unit 12, an antenna 24, a tuner 25, a playback processor 26, a data memory 27, and a communication interface 28.

By executing a program stored on the program memory 22, the controller 21 controls operation of the broadcast receiving terminal 1.

The program memory 22 stores programs to be executed by the controller 21, and data used for the execution of the programs.

The power supply circuit 23 feeds power from a battery 30 mounted on the broadcast receiving terminal 1 to each element in the broadcast receiving terminal 1.

The antenna 24 receives radio waves for radio broadcasting and television broadcasting.

The tuner 25 selects the radio waves for radio broadcasting and television broadcasting under the control of the controller 21.

The playback processor 26 plays broadcast signals selected by the tuner 25. More specifically, the playback processor 26 demodulates a received signal. The playback processor 26 performs a descramble process or a decoding process, thereby playing a received broadcast signal.

The display 11 may be a liquid-crystal display, for example. Under the control of the controller 21, the display 11 displays a video of the received broadcast signals played by the playback processor 26. The display 11 displays a graphic user interface (GUI). The GUI is used to notify a user of information assisting the user to enter a message and an operation input, and information relating to data stored on the data memory 27.

The audio output unit 12 includes the loudspeaker 12-1 and the earphone jack 12-2. Under the control of the controller 21, the audio output unit 12 outputs a sound responsive to the broadcast signal played by the playback processor 26. For example, when a earphone is connected to the earphone jack 12-2, the sound from the loudspeaker 12-1 can be optionally muted.

The operation input unit 13 includes operation input devices such as buttons, a touchpad, a touchpanel, and dials. In response to an operation input from the user, the operation input unit 13 transfers a signal indicating the user operation input to the controller 21.

The data memory 27 is composed of a hard disk, a semiconductor memory, a magnetic disk, or a magneto-optical disk. Under the control of the controller 21, the data memory 27 records the broadcast signal played by the playback processor 26. The data memory 27 stores information input from an external apparatus via the communication interface 28. The external apparatus may be a personal computer to be discussed later, for example. If the broadcast receiving terminal 1 is provided with memory slots, the data memory 27 may be removable.

The communication interface 28 has a function to interface with another apparatus in a wired or wireless fashion. The communication interface 28 exchanges information. The broadcast receiving terminal 1 receives a broadcast radio wave via the antenna 24, and then plays and records the received broadcast signal. For example, the broadcast receiving terminal 1, if connected in a wired fashion, acquires a wire broadcast program or a cable television broadcast program, and plays and records the received program. The broadcast receiving terminal 1 may acquire a variety of contents provided by the Internet, and may play and record the received content.

Figure 3:
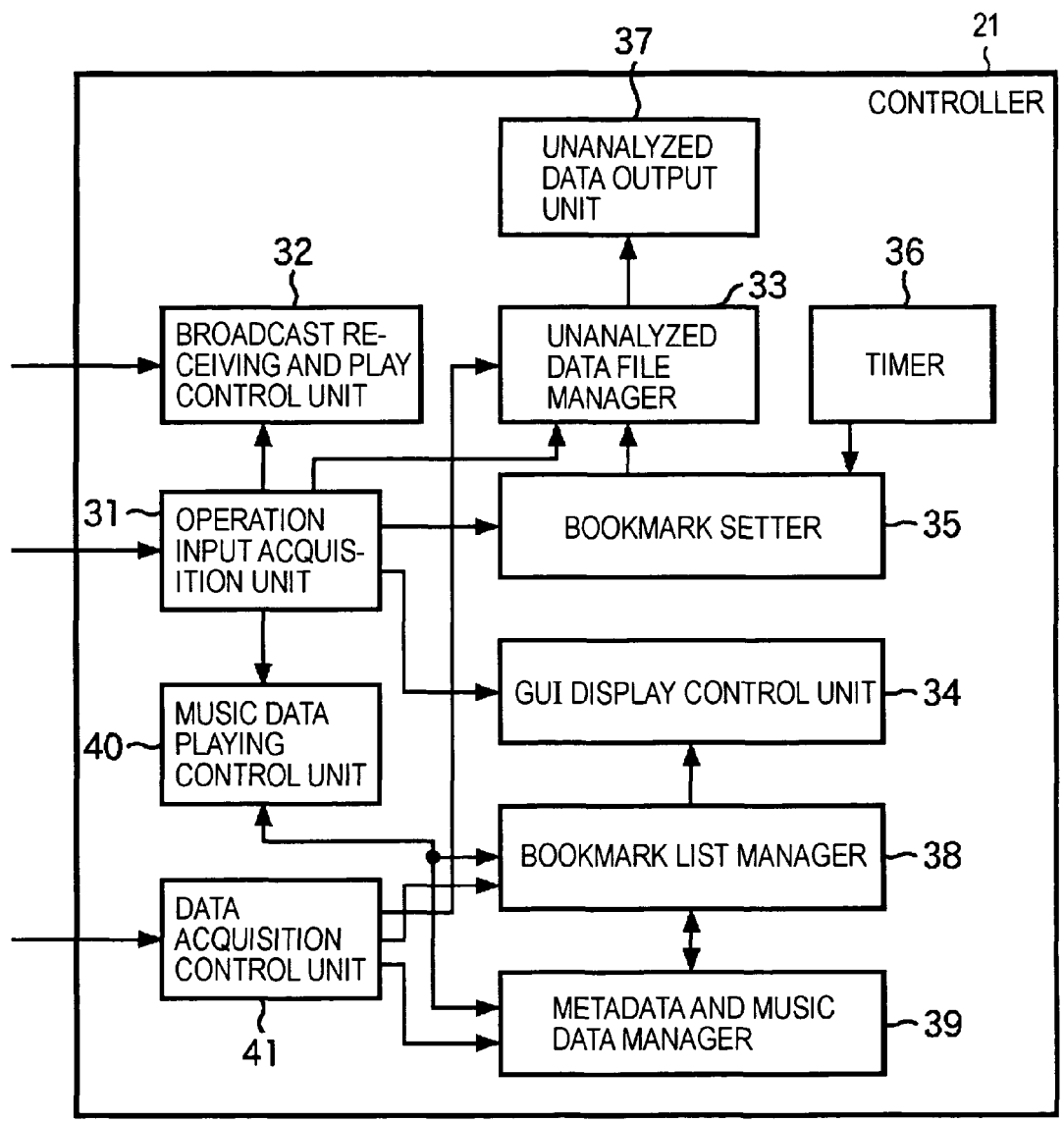
FIG. 3 is a functional block diagram illustrating a function of a controller of FIG. 2.

FIG. 3 is a functional block diagram of the controller 21 for the broadcast receiving terminal 1. Operation of the broadcast receiving terminal 1 is described below with reference to FIG. 3.

An operation input acquisition unit 31 acquires an operation input to the operation input unit 13 by the user. A broadcast receiving and play control unit 32 controls reception of a broadcast signal from a broadcasting station desired by the user by controlling the tuner 25 in response to the user operation input acquired by the operation input acquisition unit 31. The broadcast receiving and play control unit 32 also controls the playback processor 26, the audio output unit 12, and the display 11, thereby controlling playing of the received broadcast signal.

An unanalyzed data file manager 33 controls recording of the broadcast signal received by the broadcast receiving and play control unit 32 onto the data memory 27. The unanalyzed data file manager 33 generates an unanalyzed data file based on the recorded data. The unanalyzed data file manager 33 further records information, relating to a broadcasting station and broadcast time, together with the unanalyzed data file. The unanalyzed data file manager 33 records the information relating to the broadcasting station and the broadcast time because the information relating to the broadcasting station and the broadcast time is used for a personal computer to be discussed later to acquire metadata. Information the personal computer used to acquire the metadata can be occasionally information such as a broadcast coverage area, other than the broadcasting station and the broadcast time. The unanalyzed data file manager 33 obtains the information used for the personal computer to acquire the metadata.

A GUI display control unit 34 controls displaying of information assisting the user in operation input, namely, displaying of a graphic user interface (GUI) to the display A bookmark setter 35 controls a timer 36, thereby starting time counting. Under the control of the unanalyzed data file manager 33, the timer 36 starts counting elapse time from the start of recording of the broadcast signal to the data memory 27. When an operation input acquisition unit 31 acquires a bookmark command from the user, the bookmark setter 35 records time while controlling the timer 36. The time information is obtained when the bookmark setter 35 references the timer 36, and is relative time information from the start of broadcast receiving responsive to an operation input of a bookmark. If the user likes a song in a radio program or a television program being watched, the user commands the operation input unit 13 to set a bookmark. Like a bookmark for a book, the bookmark in the context of the present invention is used to mark data. In accordance with this embodiment of the present invention, the user sets a bookmark on a song that the user may like when listening to. The song with the bookmark set thereto is extracted as a song through an analysis process to be discussed later, and metadata of the song is then extracted.

The bookmark set by the bookmark setter 35 is time information relative to audio data obtained from the broadcast signal having finite play time. The bookmark set by the bookmark setter 35 is not the one pointing to music data itself. Recording the time information with the audio data mapped thereto is referred to a pre-registration of the bookmark. By pre-registering the bookmark, the broadcast receiving terminal 1 extracts the song containing the bookmark through the analysis process to be discussed later, generates a bookmark list, and acquires metadata of the song, if possible, to construct a database. The time information may not be relative time information in synchronization with the audio data but time information relative to video data received in synchronization with the audio data.

The bookmark set by the bookmark setter 35 may be any type of information as long as the bookmark can attach a "mark" on the song the user likes in the broadcast program the user is listening to. For example, the bookmark set by the bookmark setter 35 may be flag information set in an audio stream.

An unanalyzed data output unit 37 outputs to an external apparatus an audio file or a video file managed by the unanalyzed data file manager 33, and pre-registration information of the bookmark mapped to one of the files. The external apparatus may be a personal computer to be discussed later. The unanalyzed data output unit 37 controls, as necessary, outputting of information to be used in the acquisition of the metadata to the external apparatus. The metadata will be described later.

A data acquisition control unit 41 acquires from the external apparatus the analyzed music data and the corresponding metadata, and update information such as a bookmark list. The bookmark list is generated through an analysis process to be discussed later, and a list of songs on which the user has requested to set the bookmarks. The bookmark list includes link information linking the music data obtained through the analysis process and the metadata.

A bookmark list manager 38 manages the bookmark list in accordance with supplied information and records the managed bookmark list onto the data memory 27. A metadata and music data manager 39 supplies the supplied music data and the corresponding metadata to the data memory 27 for storage. In response to the user operation input acquired by the operation input acquisition unit 31, a music data playing control unit 40 reads a song selected by the user from the data memory 27, and supplies one of the display 11 and the audio output unit 12 with the selected song for playing.

Specific operation of the broadcast receiving terminal 1 is described below.

Figure 4:
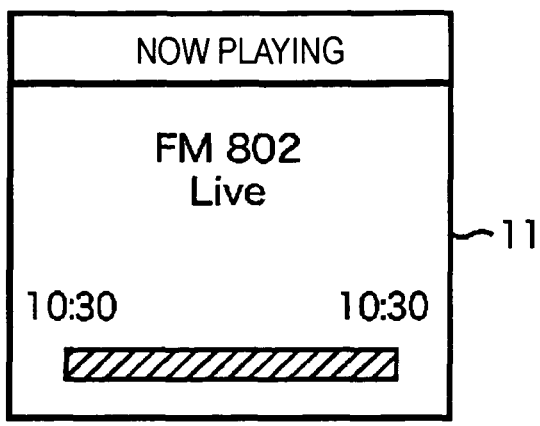
FIG. 4 illustrates a display screen of the terminal.

The broadcast receiving terminal 1 starts operating in response to an operation start command from the user. When the broadcast receiving terminal 1 starts operating, the broadcast receiving and play control unit 32 controls the tuner 25. Under the control of the broadcast receiving and play control unit 32, the tuner 25 selects a broadcasting station from which a broadcast signal was received at the end of the preceding operation. Or when the operation input acquisition unit 31 acquires a user operation input, the tuner 25 under the control of the broadcast receiving and play control unit 32 selects a corresponding broadcasting station. The broadcast receiving and play control unit 32 then supplies the playback processor 26 with the broadcast signal corresponding to the broadcast wave received by the antenna 24, thereby causing the playback processor 26 to demodulate the broadcast signal. If the received signal is a radio broadcast signal, the broadcast receiving and play control unit 32 supplies a corresponding audio signal to the audio output unit 12 for sound output. The unanalyzed data file manager 33 supplies the reproduced audio data to the data memory 27 for storage. As shown in FIG. 4, the GUI display control unit 34 causes the display 11 to display information relating to a radio program currently being output. If the received signal is a television program, the broadcast receiving and play control unit 32 supplies the reproduced audio signal to the audio output unit 12 for sound output while outputting a reproduced video signal to the display 11 for displaying. The unanalyzed data file manager 33 supplies the reproduced audio and video to the data memory 27 for storage. In the same way as discussed with reference to FIG. 4, the GUI display control unit 34 causes the display 11 to display information relating to the television broadcast program currently being output in a manner such that the displayed information may not hide the video displayed on the display 11. The bookmark setter 35 controls the timer 36, thereby starting counting elapse time from the start of the recording of the broadcast signal to the data memory 27.

The operation input acquisition unit 31 may receive a rewind command, a fast-forward command, a pause command or the like relating to a portion of the broadcast signal currently being received and recorded onto the data memory 27. In response to the user operation input, the broadcast signal receiving and play control unit 32 reads the broadcast signal recorded on the data memory 27 and then supplies the broadcast signal to one of the display 11 and the audio output unit 12. The unanalyzed data file manager 33 causes the data memory 27 to continuously record on a real-time basis the broadcast signal currently being received.

When the operation input acquisition unit 31 receives the operation input for a bookmark command from the operation input unit 13, the bookmark setter 35 references the timer 36 and records the relative time information at the reception of the operation input for the bookmark command with respect to the broadcast receiving start point. This operation is the above-described bookmark pre-registration process.

Figure 5:
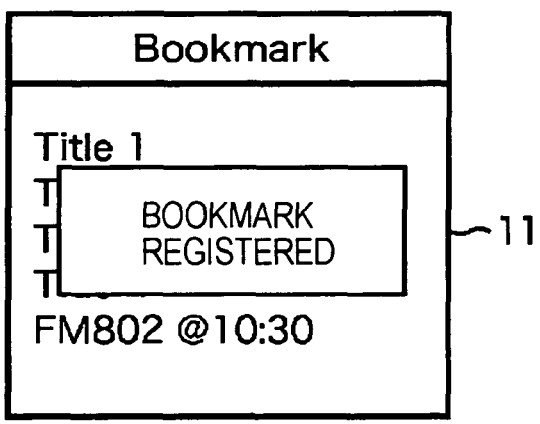
FIG. 5 illustrates the display screen of the terminal.

The GUI display control unit 34 causes the display 11 to display a message notifying the user of the reception of the bookmark command. The notification of the bookmark command reception may be something like the one shown on the display 11 of FIG. 5.

The operation input acquisition unit 31 may receive operation input commands such as for tuning, change of broadcasting station, change of channel, and ending broadcast reception. When the operation input acquisition unit 31 receives such an operation input, the unanalyzed data file manager 33 determines whether the broadcast signal is recorded on the data memory 27 with the time information relative to the broadcast receiving start time mapped thereto. More specifically, the unanalyzed data file manager 33 determines whether the bookmark is pre-registered in the broadcast signal recorded on the data memory 27. If the bookmark is pre-registered, the unanalyzed data file manager 33 attaches a unique file name to the recorded broadcast signal using the time of file generation or the name of a received broadcasting station, and then stores the broadcast signal as an unanalyzed data file onto the data memory 27. The unanalyzed data file manager 33 stores the unanalyzed data file with the relative time information of the bookmark recorded by the bookmark setter 35 mapped thereto. A plurality of pieces of pre-registration information of the bookmark, namely, the relative time information of the bookmark, can be mapped to a single file.

The unanalyzed data file manager 33 obtains information the personal computer uses to acquire the metadata, and records the information together with the unanalyzed data file. The information used to acquire the metadata may be information relating to a broadcasting station and broadcast time, for example.

Each time the unanalyzed data file manager 33 receives one of operation commands for tuning, change of broadcasting station, change of channel, ending the broadcast reception, etc., the unanalyzed data file manager 33 determines whether at least one bookmark is pre-registered in the broadcast signal recorded on the data memory 27. The unanalyzed data file manager 33 generates the unanalyzed data file for the broadcast signal having at least one bookmark pre-registered therein. More specifically, the unanalyzed data file manager 33 may generate a plurality of unanalyzed data files.

When connected via the communication interface 28 to the personal computer to be discussed later, the broadcast receiving terminal 1 supplies the unanalyzed data file and the pre-registration information of the bookmark mapped to the file, recorded on the data memory 27, to the personal computer. The broadcast receiving terminal 1 supplies to the personal computer information such as the broadcasting station and the broadcast time as necessary. More specifically, the unanalyzed data output unit 37 reads from the data memory 27 the unanalyzed data file of the sound or video and the pre-registration information of the bookmark mapped to the file, managed by the unanalyzed data file manager 33, and supplies the read data to the personal computer via the communication interface 28. The unanalyzed data output unit 37 reads the information such as the broadcasting station and the broadcast time from the data memory 27 as necessary, and supplies the read data to the personal computer. The personal computer performs the analysis process as will be described later.

The broadcast receiving terminal 1 receives analyzed information from the personal computer. The broadcast receiving terminal 1 records the analyzed information and plays the information in response to an operation input from the user.

Figure 6:
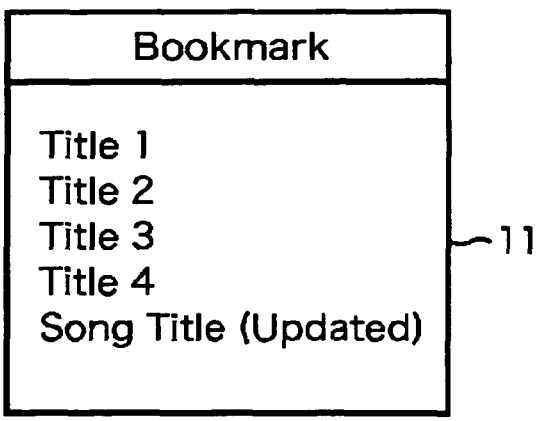
FIG. 6 illustrates the display screen of the terminal.

More specifically, the broadcast receiving terminal 1 receives the analyzed information from the personal computer via the communication interface 28. In response to the supplied information, the bookmark list manager 38 records or updates the bookmark list. The metadata and music data manager 39 supplies to the data memory 27 the metadata corresponding to the supplied music data for storage. The user enters a command to the operation input unit 13 to play the song recorded on the data memory 27 and analyzed and then supplied by the personal computer. When the operation input acquisition unit 31 receives such a command, the GUI display control unit 34 causes the display 11 to display a bookmark list. FIG. 6 illustrates a bookmark list displayed on the display 11. The bookmark list is a list of metadata such as playable songs and the title of the songs. The user can select a song to be played from the bookmark list.

Viewing a display screen of FIG. 6, the user selects a desired song from the bookmark list using the operation input unit 13. The operation input acquisition unit 31 receives a song selection operation input from the user. Upon acquiring the song selection operation input from the user, the music data playing control unit 40 reads the song selected by the user from the data memory 27. The music data playing control unit 40 supplies the song read from the data memory 27 to one of the display 11 and the audio output unit 12 for playing.

Figure 7:
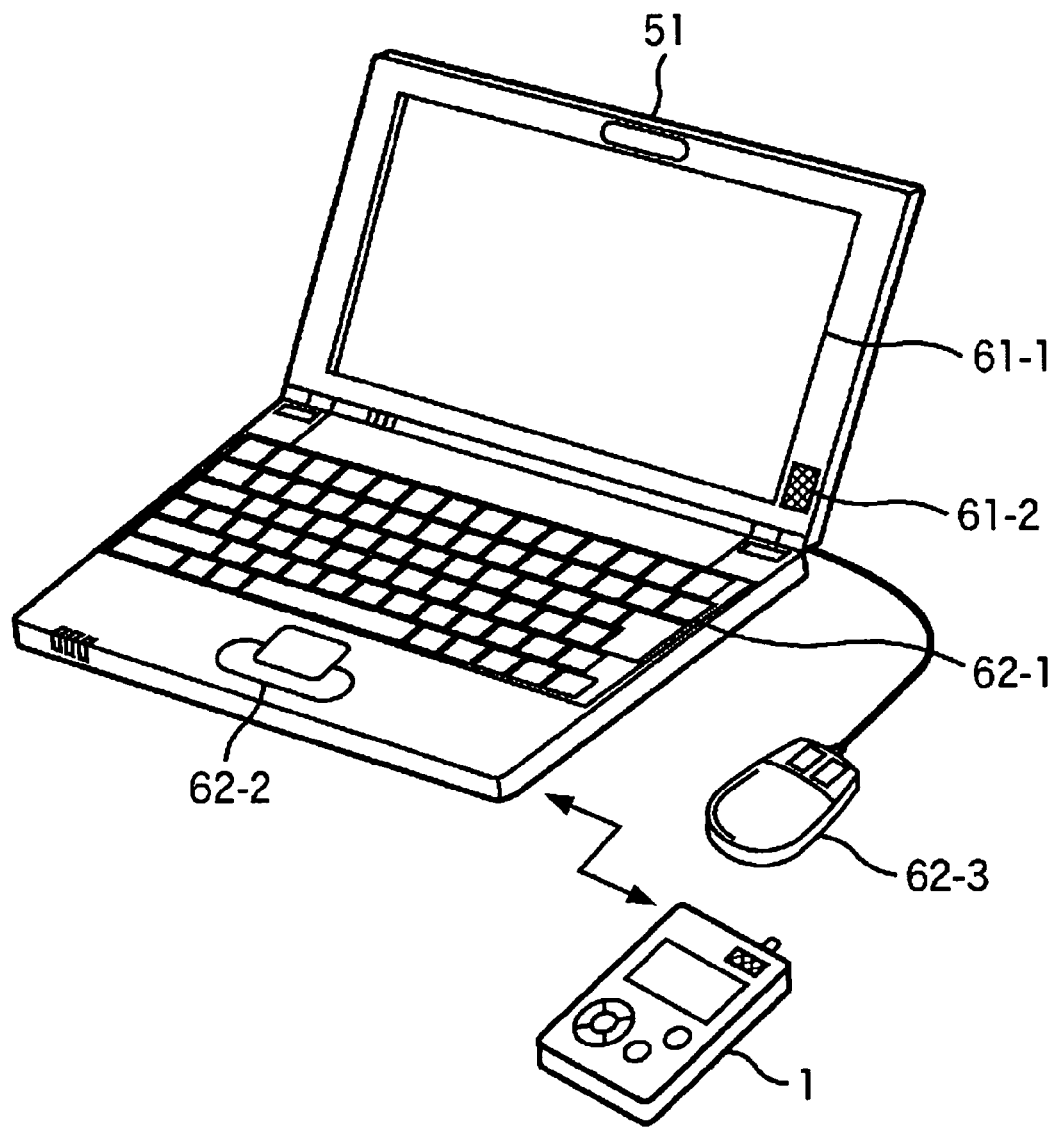
FIG. 7 is an external view of a personal computer in accordance with one embodiment of the present invention.

FIG. 7 illustrates the broadcast receiving terminal 1 discussed with reference to FIGS. 1 and 2, and a personal computer 51 connected to the broadcast receiving terminal 1 in a wired fashion. The broadcast receiving terminal 1 and the personal computer 51 can be connected not only in a wired fashion but also in a wireless fashion or via a predetermined network.

The personal computer 51 includes an output unit 61 composed of a display 61-1 and a loudspeaker 61-2, and an input unit 62 composed of a keyboard 62-1, a touchpad 62-2, and a mouse 62-3.

The personal computer 51 of FIG. 7 is a notebook type computer. A desk-top computer may also be used for the personal computer 51.

Figure 8:
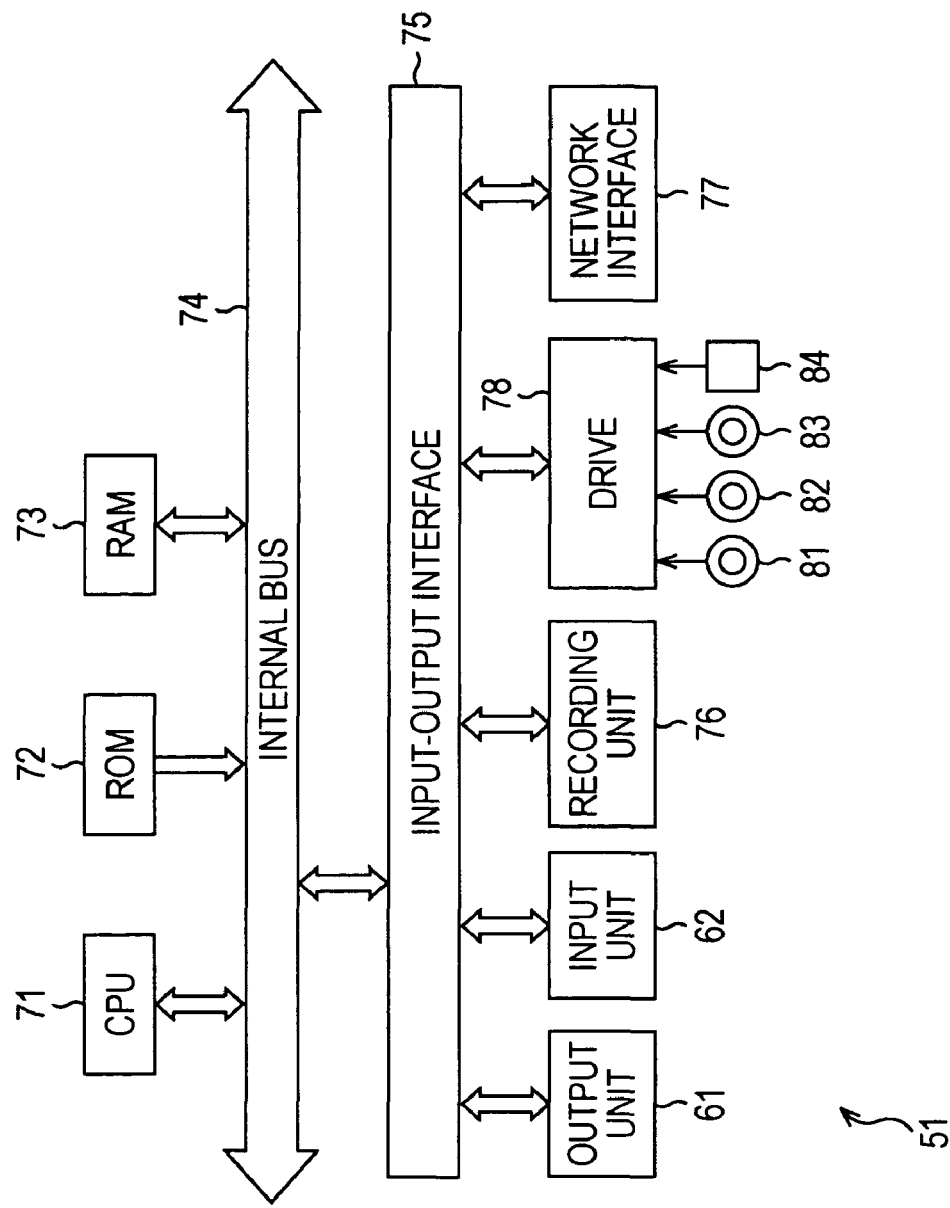
FIG. 8 is a block diagram illustrating a configuration of the personal computer of FIG. 7.

FIG. 8 is a block diagram of a configuration of the personal computer 51 of FIG. 2.

A central processing unit (CPU) 71 performs a variety of processed under the control of a program stored on a read-only memory (ROM) 72. The CPU 71 also performs a variety processes under the control of a program loaded from a recording unit 76, such as a hard disk drive (HDD), to a random-access memory (RAM) 73. The RAM 73 stores, as necessary, data used for the CPU 71 to execute a variety of processes.

The CPU 71, the ROM 72, and the RAM 73 are interconnected to each other via an internal bus 74. The internal bus 74 connects to an input-output interface 75.

The input-output interface 75 connects to an output unit 61, an input unit 62, a recording unit 76, and a network interface 77. The output unit 61 is composed of a display 61-1 and a loudspeaker 61-2. The display 61-1 includes one of a cathode-ray tube (CRT) and a liquid-crystal display (LCD). The input unit 62 includes a keyboard 61-2, a touchpad 62-2, and a mouse 62-3. The recording unit 76 includes a hard disk. The network interface 77 includes a modem, a terminal adaptor, etc. The network interface 77 performs a communication process with another apparatus such as the broadcast receiving terminal 1 in a wired fashion or a wireless fashion or a network such as the Internet.

The input-output interface 75 also connects to the drive 78 as necessary. One of recording media including a magnetic disk 81, an optical disk 82, a magneto-optical disk 83, and a semiconductor memory 84 can be loaded onto the drive 78. A computer program read from the loaded recording medium is stored onto the recording unit 76 and then installed onto the personal computer.

The main function and operation of the CPU 71 in the personal computer 51 are described below. The CPU 71 analyzes data supplied from the broadcast receiving terminal 1. The CPU 71 organizes a database by acquiring metadata while generating a bookmark. The main function and operation of the CPU 71 are executed by application software. FIG. 9 is a functional block diagram of the CPU 71 of the personal computer 51. When the application software is executed as shown in the functional block diagram, the personal computer receives the data supplied from the broadcast receiving terminal 1, and organizes the database by acquiring the metadata while generating the bookmark.

An unanalyzed data acquisition control unit 101 receives an unanalyzed audio file or an unanalyzed video file from the broadcast receiving terminal 1 via the network interface 77, and stores the acquired file on the recording unit 76. The unanalyzed data acquisition control unit 101 also receives the pre-registration information of the bookmark recorded with the one of the unanalyzed audio file and the unanalyzed video file mapped thereto. Furthermore, the unanalyzed data acquisition control unit 101 receives, from the broadcast receiving terminal 1, information to be used to acquire the metadata and stores the information onto the recording unit 76. The information to be used to acquire the metadata includes information relating to the broadcasting station and the broadcast time.

A data analysis processor 102 analyzes one of the unanalyzed audio file and the unanalyzed video file, each stored on the recording unit 76. Through that analysis, the data analysis processor 102 extracts a music portion and information used to acquire the metadata. A metadata acquisition control unit 103 acquires the metadata based on the analysis result of the data analysis processor 102.

A database organizer 104 organizes a database of music based on the music data obtained as a result of analysis and the metadata corresponding to the music data.

A bookmark list generator 105 generates a bookmark list listing the music data that is obtained by analyzing the pre-registration of bookmarks. The pre-registration of the bookmark is set in response to the user operation input in the broadcast receiving terminal 1. The bookmark list is a list of songs in which the user issues a command to set a bookmark. Furthermore, the bookmark list is a list of link information of the music data of the database organized in the database organizer 104 and the metadata. A bookmark listed in the bookmark list generated by the bookmark list generator 105 is referred to as a registered bookmark as opposed to the pre-registered bookmark.

An analyzed data supply control unit 106 controls supplying of the music data resulting from the analysis, the metadata corresponding to the music data, and update information about the bookmark list to the broadcast receiving terminal 1.

Specific operation using these functions is described below.

The broadcast receiving terminal 1 is connected to the personal computer 51 in a wired fashion or a wireless fashion. When the broadcast receiving terminal 1 is connected to the personal computer 51, the unanalyzed data acquisition control unit 101 determines whether the data memory 27 stores the unanalyzed data file and the pre-registration information of the bookmark mapped to the file. The unanalyzed data file is one of an unanalyzed audio file and an unanalyzed video file. When the data memory 27 in the broadcast receiving terminal 1 stores the unanalyzed data file and the pre-registration information of the bookmark, the unanalyzed data acquisition control unit 101 acquires the unanalyzed data file and the pre-registration information of the bookmark from the broadcast receiving terminal 1 via the network interface 77 and stores the acquired information onto the recording unit 76. The unanalyzed data acquisition control unit 101 obtains the information to be used to acquire the metadata and stores the obtained information onto the recording unit 76. The information to be used to acquire the metadata may include information relating to the broadcasting station and the broadcast time, for example.

The data analysis processor 102 analyzes the unanalyzed data file that has been acquired from the unanalyzed data acquisition control unit 101 and stored on the recording unit 76. The data analysis processor 102 analyzes the unanalyzed data file using an analysis method such as the one disclosed in Japanese Unexamined Patent Application Publication No. 2005-274708. The data analysis processor 102 can discriminate the music portion and the other portion such as a conversation of an announcer based on feature quantities such as tempo and sense of speed of a song in the unanalyzed data file. The data analysis processor 102, based on the analysis results therefrom and the pre-registration information of the bookmark, extracts the music portion, containing relative time, with the bookmark set thereto by the user. The data analysis processor 102 also extracts or analyzes the information used to acquire the metadata. The data analysis processor 102 supplies the metadata acquisition control unit 103 with the information, acquired as a result of extraction or analysis, and used to acquire the metadata.

By sending part of the music data to a predetermined server that performs search service, the broadcast receiving terminal 1 can obtain the metadata. When the broadcast receiving terminal 1 acquires the metadata in this way, the data analysis processor 102 extracts a portion of the song to be transmitted to the predetermined server. The metadata acquisition control unit 103 transmits the portion of the song, extracted by the data analysis processor 102, to the predetermined server. The server performs the search process in accordance with the portion of the received song. The server transmits to the broadcast receiving terminal 1 the metadata corresponding to the received song as a result of search. Optionally, the broadcast receiving terminal 1 may transfer a feature quantity of the song to the server to acquire the metadata. When the metadata is acquired in this method, the data analysis processor 102 extracts the feature quantity for use in the search of the song. The data analysis processor 102 supplies the extracted feature quantity of the song to the metadata acquisition control unit 103. The metadata acquisition control unit 103 transmits the extracted feature quantity of the song to the predetermined server to acquire the metadata from the server. When the information such as the broadcasting station and the broadcast time is used to acquire the metadata, the data analysis processor 102 acquires the information such as the broadcasting station and the broadcast time from the unanalyzed data acquisition control unit 101.

The metadata acquisition control unit 103 transmits the portion of the song or the feature quantity of the song for use in the search process to the predetermined server via the internal bus 74, the input-output interface 75, and the network interface 77. The predetermined server uses the portion of the song to provide the search service. The metadata acquisition control unit 103 supplies the recording unit 76 with the metadata received via the network interface 77. The metadata acquisition control unit 103 also transmits the information relating to the broadcasting station and the broadcast time to the predetermined server via the internal bus 74, the input-output interface 75, and the network interface 77. The predetermined server uses the information relating to the broadcasting station and the broadcast time to provide the search service. The metadata acquisition control unit 103 supplies the metadata received via the network interface 77 to the recording unit 76.

The metadata acquisition control unit 103 may acquire the metadata using a combination of the above-described methods.

The database organizer 104 organizes the database of songs. The database of songs can be organized by recording the bookmarked music data obtained through the analysis process of the data analysis processor 102, and the metadata corresponding to the music data acquired from the metadata acquisition control unit 103 with the bookmarked music data mapped to the metadata.

The bookmark list generator 105 generates the bookmark list that is information representing the mapping between the database generated by the database organizer 104 and the bookmark. The bookmark list generator 105 transmits the generated bookmark list to the recording unit 76 via the internal bus 74 and the input-output interface 75 for storage.

When the broadcast receiving terminal 1 is connected to the personal computer 51, the analyzed data supply control unit 106 determines whether the bookmark list stored on the broadcast receiving terminal 1 is an updated list. If the analyzed data supply control unit 106 determines that the bookmark list stored on the broadcast receiving terminal 1 is not an updated list, the analyzed data supply control unit 106 supplies the broadcast receiving terminal 1 with the music data obtained through the analysis, the metadata corresponding to the music data, and update information of the bookmark list.

The processes performed by the broadcast receiving terminal 1 and the personal computer 51 is described below with reference to flowcharts of FIGS. 10, 11, and 12.

A first broadcast receiving and recording process of the broadcast receiving terminal 1 is described below with reference to the flowchart of FIG. 10.

In step S1, the operation input acquisition unit 31 determines whether the user has provided a command to start receiving a broadcast signal. If it is determined in step S1 that the command to start receiving the broadcast signal has not been provided, the operation input acquisition unit 31 repeats step S1 until it is determined that the command to start receiving the broadcast signal has been provided.

If it is determined in step S1 that the command to start receiving the broadcast signal has been provided, processing proceeds to step S2. In step S2, the operation input acquisition unit 31 supplies a signal indicative of the user operation input to the broadcast receiving and play control unit 32. The broadcast receiving and play control unit 32 determines one of a receiving frequency and a receiving channel in response to the supplied signal indicative of the user operation input. The broadcast receiving and play control unit 32 controls the tuner 25 to select the determined receiving channel, thereby selecting the broadcast signal received by the antenna 24.

In step S3, the broadcast receiving and play control unit 32 controls the antenna 24 and the tuner 25, thereby starting receiving the broadcast signal.

In step S4, the unanalyzed data file manager 33 starts recording the received signal on the data memory 27. The bookmark setter 35 causes the timer 36 to start counting relative time.

In step S5, the GUI display control unit 34 causes the display 11 to display the GUI to notify the user that the currently received broadcast program is now played. The GUI currently displayed is something like the one shown in FIG. 4.

In step S6, the broadcast receiving and play control unit 32 controls the playback processor 26, thereby causing the audio output unit 12 to output an audio sound responsive to the received broadcast signal. If necessary, the broadcast receiving and play control unit 32 causes the display 11 to display the received broadcast signal.

In step S7, the operation input acquisition unit 31 determines whether a bookmark command has been received from the user.

If the operation input acquisition unit 31 determines in step S7 that the bookmark command has been received, processing proceeds to step S8. The operation input acquisition unit 31 notifies in step S8 the bookmark setter 35 that the bookmark command has been received from the user. By referencing the timer 36, the bookmark setter 35 records the broadcast signal currently being recorded with the relative time at the bookmark command mapped thereto.

If the operation input acquisition unit 31 determines in step S7 that the bookmark has not been received, processing proceeds to step S9. When the process in step S8 is completed, processing also proceeds to step S9. The operation input acquisition unit 31 determines in step S9 whether any of commands to end the reception of the broadcast signal, and to change one of the receiving frequency and the receiving channel has been received from the user. If the operation input acquisition unit 31 determines in step S9 that any of commands to end the reception of the broadcast signal, and to change one of the receiving frequency and the receiving channel has not been received from the user, processing returns to step S7 to repeat step S7 and subsequent steps.

If the operation input acquisition unit 31 determines in step S9 that one of commands to end the reception of the broadcast signal, and to change one of the receiving frequency and the receiving channel has been received from the user, processing proceeds to step S10. The broadcast receiving and play control unit 32 controls the playback processor 26 in step S10, thereby ending the output of the played received broadcast signal. The unanalyzed data file manager 33 finishes recording the received broadcast signal on the data memory 27.

In step S11, the unanalyzed data file manager 33 determines whether the bookmark setter 35 has pre-registered the bookmark on the broadcast signal recorded on the data memory 27.

If the unanalyzed data file manager 33 determines in step S11 that the bookmark has been pre-registered, processing proceeds to step S12. In step S12, the unanalyzed data file manager 33 attaches a predetermined file name to the broadcast signal recorded on the data memory 27 wherein the recording of the broadcast signal has started in step S4 and ended in step S10. The unanalyzed data file manager 33 thus generates a unanalyzed data file. The unanalyzed data file manager 33 stores the generated unanalyzed data file onto the data memory 27. Furthermore, the unanalyzed data file manager 33 maps the pre-registered bookmark to the generated unanalyzed data file and then stores the bookmark and the unanalyzed data file mapped to each other onto the data memory 27. The unanalyzed data file manager 33 maps the information used to acquire the metadata to the generated unanalyzed data file before storing the information and the unanalyzed data file. The information used to acquire the metadata includes information relating to the broadcasting station, the broadcast time, and receiving location.

If the unanalyzed data file manager 33 determines in step S11 that the bookmark has not been pre-registered, processing proceeds to step S13. In step S13, the unanalyzed data file manager 33 deletes from the data memory 27 the broadcast signal the recording of which has started in step S4 and ended in step S10.

Processing proceeds to step S14 subsequent to step S12 or step S13. The operation input acquisition unit 31 determines in step S14 whether the reception of the broadcast signal has been completed.

If the operation input acquisition unit 31 determines in step S14 that the reception of the broadcast signal has not been completed, processing returns to step S2 to repeat step S2 and subsequent steps. If the operation input acquisition unit 31 determines in step S14 that the reception of the broadcast signal has been completed, processing ends.

The bookmark is pre-registered in response to the user operation input through these process steps when the broadcast signal is received and played. The predetermined file name is attached to the bookmark pre-registered broadcast signal as an unanalyzed data file. The unanalyzed data file is stored on the data memory 27 with the pre-registered bookmark mapped thereto. As necessary, the information used to acquire the metadata is also mapped to the unanalyzed data file, and then recorded.

If the recorded broadcast signal is a television broadcast program, an unanalyzed data file includes video data mapped to the music data. The unanalyzed data file is recorded with the pre-registered bookmark and, as necessary, the information used to acquire the metadata mapped thereto.

A first process of the personal computer 51 to be connected to the broadcast receiving terminal 1 is described below with reference to a flowchart of FIG. 11.

In step S41, the unanalyzed data acquisition control unit 101 determines whether the broadcast receiving terminal 1 is connected to the personal computer 51. The broadcast receiving terminal 1 and the personal computer 51 may be connected to each other directly or via a predetermined network. The broadcast receiving terminal 1 may be connected to the personal computer 51 in a wired fashion or a wireless fashion. If it is determined in step S41 that the broadcast receiving terminal 1 is not connected to the personal computer 51, step s41 is repeated until the unanalyzed data acquisition control unit 101 determines that the broadcast receiving terminal 1 is connected to the personal computer 51.

If the unanalyzed data acquisition control unit 101 determines in step S41 that the broadcast receiving terminal 1 is connected to the personal computer 51, processing proceeds to step S42. In step S42, the unanalyzed data acquisition control unit 101 acquires necessary information from the broadcast receiving terminal 1.

In step S43, the unanalyzed data acquisition control unit 101 determines whether an unprocessed broadcast signal is recorded on the broadcast receiving terminal 1. More specifically, the unanalyzed data acquisition control unit 101 determines whether the data memory 27 stores the unanalyzed data file generated by the unanalyzed data file manager 33 in step S12 of FIG. 10 and the pre-registration information of the bookmark mapped to the unanalyzed data file. As necessary, the unanalyzed data acquisition control unit 101 determines whether the information used to acquire the metadata is stored on the data memory 27 in the broadcast receiving terminal 1. If the unanalyzed data acquisition control unit 101 determines in step S43 that the broadcast receiving terminal 1 does not store any unprocessed broadcast signal, processing proceeds to step S51.

If the unanalyzed data acquisition control unit 101 determines in step S43 that the broadcast receiving terminal 1 stores an unprocessed broadcast signal, processing proceeds to step S44. In step S44, the unanalyzed data acquisition control unit 101 acquires from the broadcast receiving terminal 1 the unprocessed data file and information mapped thereto. The unanalyzed data acquisition control unit 101 supplies the acquired unanalyzed data file and the information mapped thereto to the data analysis processor 102. Using an analysis method such as the one disclosed in Japanese Unexamined Patent Application Publication No. 2005-274708, the data analysis processor 102 analyzes the unprocessed broadcast signal. Through this analysis process, the data analysis processor 102 divides the unprocessed broadcast signal into a music portion and the other portion in accordance with the feature quantity such as the temp and sense of speed of the audio signal.

In step S45, the data analysis processor 102 extracts the bookmark pre-registered music data from the divided data. More specifically, the data analysis processor 102 extracts the music data that is played at the moment the user has issued the bookmark command, from among the divided data.

In step S46, the data analysis processor 102 extracts the information used to acquire the metadata of the bookmark pre-registered music data, in accordance with the divided and extracted music data or the information supplied from the broadcast receiving terminal 1. For example, the information used to acquire the metadata includes information such as a portion of the song, feature quantity data of the portion of the song, the broadcasting station broadcasting the song, the broadcast time, and the broadcast coverage area. The data analysis processor 102 supplies the information used to acquire the metadata to the metadata acquisition control unit 103. The metadata acquisition control unit 103 transmits the information used to acquire the metadata corresponding to the music data to a predetermined server providing search service of music data.

In step S47, the metadata acquisition control unit 103 supplies the metadata received via the network interface 77 to the recording unit 76.

In step S48, the database organizer 104 maps the music data corresponding to the metadata acquired through the analysis process of the data analysis processor 102 to the metadata corresponding to the music data acquired by the metadata acquisition control unit 103 and then registers the music data and the metadata mapped thereto in the database stored on the recording unit 76. If the music data is supplied from the broadcast receiving terminal 1 with the video data mapped thereto, the video data is recorded together with the music data onto the database. When the broadcast signal received by the broadcast receiving terminal 1 is a television broadcast program, the music data is supplied from the broadcast receiving terminal 1 with the video data mapped thereto.

In step S49, the bookmark list generator 105 registers the music data stored in the database in the bookmark list recorded on the recording unit 76. The bookmark list is a list of songs which have been bookmarked by the user. Furthermore, the bookmark list is a list of link information relating to the music data of the database organized by the database organizer 104 and the metadata. In step S49, the bookmark list generator 105 registers the music data with the bookmark list recorded on the recording unit 76 mapped thereto. This operation is the bookmark registration process in the personal computer 51.

In step S50, the data analysis processor 102 deletes the broadcast signal that has undergone the analysis. The information to be deleted in step S50 is the original broadcast signal that has undergone the analysis process. The divided and extracted music data, namely, the music data registered on the database, is not deleted but stored.

If the unanalyzed data acquisition control unit 101 determines in step S43 that the broadcast receiving terminal 1 does not store any unprocessed broadcast signal, processing proceeds to step S51. Processing also proceeds to step S51 subsequent to the completion of step S50. In step S51, the analyzed data supply control unit 106 determines whether to perform an update process to update the bookmark list recorded on the broadcast receiving terminal 1. The analyzed data supply control unit 106 automatically detects the content of the bookmark list recorded on the broadcast receiving terminal 1, and compares the bookmark list with the updated bookmark list generated by the bookmark list generator 105. Through the comparison process, the analyzed data supply control unit 106 determines whether to perform the update process on the bookmark list stored on the broadcast receiving terminal 1. Optionally, the analyzed data supply control unit 106 may automatically perform the update process if the bookmark list recorded on the broadcast receiving terminal 1 is not the update list. Alternatively, the analyzed data supply control unit 106 may perform the update process on the bookmark list when the user has provided a command to perform the update process on the bookmark list. If the analyzed data supply control unit 106 determines not to perform the update process on the bookmark list in step S51, processing ends.

If the analyzed data supply control unit 106 determines to perform the update process in step S51, processing proceeds to step S52. In step S52, the analyzed data supply control unit 106 supplies to the broadcast receiving terminal 1 the information used to update the bookmark list, and the bookmark list manager 38 in the broadcast receiving terminal 1 updates the bookmark list thereof. The information used to update the bookmark list may be the entire bookmark list or a portion of the bookmark list to be updated. The update process of the bookmark list in the broadcast receiving terminal 1 is referred to as registration of the bookmark list in the broadcast receiving terminal 1. The update process of the bookmark list in the broadcast receiving terminal 1 will be described later with reference to step S83 of FIG. 12.

In step S53, the analyzed data supply control unit 106 supplies the metadata corresponding to the updating of the bookmark list and the music data to the broadcast receiving terminal 1.

In step S54, the analyzed data supply control unit 106 commands the broadcast receiving terminal 1 to delete the unprocessed broadcast signal corresponding to the updating of the bookmark list. More specifically, the analyzed data supply control unit 106 issues a command to delete the unanalyzed data file registered in the bookmark list. Processing then ends.

Through the above-described process, the personal computer 51 acquires and analyzes the pre-registration information of the bookmark in the broadcast receiving terminal 1 and the corresponding broadcast signal. The personal computer 51 then obtains the metadata, organizes the database based on the music data and the metadata. The personal computer 51 registers the bookmark list, thereby generating or updating the bookmark list. The updated bookmark list, the music data and the metadata are then transmitted to the broadcast receiving terminal 1. If the video data is supplied with the music data mapped thereto from the broadcast receiving terminal 1, the video data is registered together with the music data onto the database. The updated bookmark list, the music data, the video data, and the metadata are then supplied to the broadcast receiving terminal 1.

A data acquisition and bookmark list update process is described below with reference to a flowchart of FIG. 12. The data acquisition and bookmark list update process is performed by the broadcast receiving terminal 1 connected to the personal computer 51 that has analyzed the data.

In step S81, the data acquisition control unit 41 determines whether to perform the update process on the bookmark list recorded on the broadcast receiving terminal 1 based on the determination result of the analyzed data supply control unit 106 in the personal computer 51. Whether to perform the update process on the bookmark list recorded on the broadcast receiving terminal 1 is determined based on the comparison result of the analyzed data supply control unit 106 in the personal computer 51. The analyzed data supply control unit 106 in the personal computer 51 compares the content of the bookmark list recorded on the broadcast receiving terminal 1 with the updated bookmark list recorded on the personal computer 51. Optionally, the update process may be performed automatically if the bookmark list recorded on the broadcast receiving terminal 1 is different from the updated list. Alternatively, the update process may be performed on the bookmark list when the user has issued a command to perform the update process on the bookmark list. If the data acquisition control unit 41 determines in step S81 that the update process is not to be performed on the bookmark list, step 81 is repeated until the data acquisition control unit 41 determines to perform the update process on the bookmark list.

If the data acquisition control unit 41 determines in step S81 that the update process is to be performed, processing proceeds to step S82. In step S82, the data acquisition control unit 41 receives the update information of the bookmark list from the personal computer 51. The data acquisition control unit 41 supplies the supplied update information of the bookmark list to the bookmark list manager 38. The information used to update the bookmark list may be an updated bookmark list or only an updated portion of the bookmark list.

In step S83, the bookmark list manager 38 updates the bookmark list in response to the supplied information. The broadcast receiving terminal 1 then registers the bookmark.

In step S84, the data acquisition control unit 41 receives the metadata corresponding to the updated bookmark list and the music data from the personal computer 51. The data acquisition control unit 41 then supplies the metadata corresponding to the updated bookmark list and the music data to the metadata and music data manager 39.

In step S85, the metadata and music data manager 39 causes the data memory 27 to record the supplied metadata and music data.

In step S86, the data acquisition control unit 41 receives from the personal computer 51 a command to delete the unprocessed broadcast signal corresponding to the updated bookmark list. That command is the one the personal computer 51 has transmitted to the broadcast receiving terminal 1 in step S54 of FIG. 11. The data acquisition control unit 41 supplies the unanalyzed data file manager 33 with the command to delete the unprocessed broadcast signal corresponding to the received updated bookmark list.

In step S87, the unanalyzed data file manager 33 deletes the unprocessed broadcast signal corresponding to the updated bookmark list. Processing then ends.

The unprocessed broadcast signal may be deleted at the timing the personal computer 51 receives the necessary information from the broadcast receiving terminal 1. The deletion of the unprocessed broadcast signal may be the above-described process in step S54, or step S86 and step S87. The timing the personal computer 51 receives the necessary information from the broadcast receiving terminal 1 may be subsequent to the process in step S42, for example.

Through the above-described process, the analyzed music data and the metadata are supplied from the personal computer 51 to the broadcast receiving terminal 1, and the bookmark is then registered in the broadcast receiving terminal 1. Subsequent to the registration of the bookmark, a list of playable music data as discussed with reference to FIG. 6 is displayed on the display 11 in the broadcast receiving terminal 1 in response to the user operation input. The music data, if the music data thereof is available, is displayed on the list display screen together with the title of the song and the name of the artist of the song associated therewith. When the user wishes to select, for playback, desired music data from the list of the music data playable in the playing process discussed with reference to FIG. 6, the bookmark list is referenced and the corresponding data of the song is read from the data memory 27. The music data read from the data memory 27 is played by the audio output unit 12. If the video data is mapped to the music data, the video data is displayed on the display 11 in synchronization with the audio output. When the recorded broadcast signal is a television broadcast program, the video data is mapped to the music data.

In the above discussion, when the broadcast receiving terminal 1 receives the broadcast signal, the broadcast signal is recorded on the data memory 27. Only when the bookmark is pre-registered in response to the user operation input, the unanalyzed data file as the broadcast signal is supplied to the personal computer 51 for analysis. Optionally, the broadcast receiving terminal 1 may include a buffer for temporarily storing the broadcast signal. With the buffer, the broadcast receiving terminal 1 stores the broadcast signal on the data memory 27 only when the bookmark is pre-registered in response to the user operation input.

Figure 13:
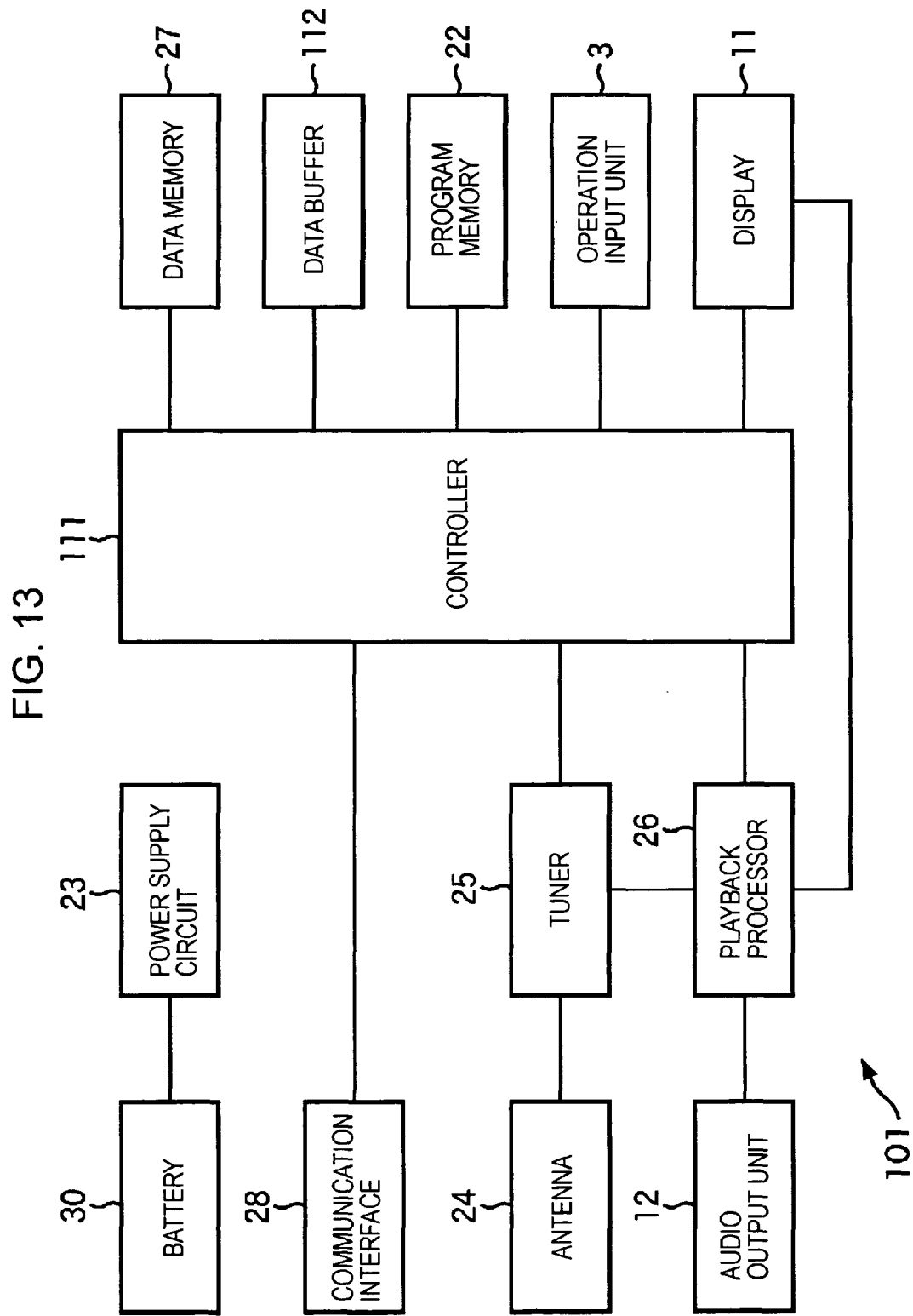
FIG. 13 is a block diagram of another broadcast receiving terminal.

FIG. 13 is a block diagram illustrating a configuration of a broadcast receiving terminal 101 having a buffer temporarily storing the broadcast signal.

Elements identical to those discussed with reference to FIG. 2 are designated with the same reference numerals, and the discussion thereof is omitted herein.

The broadcast receiving terminal 101 of FIG. 13 is identical in configuration to the broadcast receiving terminal 1 of FIG. 2 except that a controller 111 is substituted for the controller 21 and that a data buffer 112 is additionally used.

The controller 111 controls the broadcast receiving terminal 101 by executing a program stored on the program memory 22.

The data buffer 112 has a memory size sufficient enough to buffer the broadcast signal of 10 minutes to 20 minutes, for example. In other words, the data buffer 112 has a memory size sufficient enough to store one typical song. The data buffer 112 under the control of the controller 111 buffers the broadcast signal played by the playback processor 26. A memory as the data buffer 112, even if smaller in memory size than the data memory 27, preferably consumes less power for driving.

Figure 14:
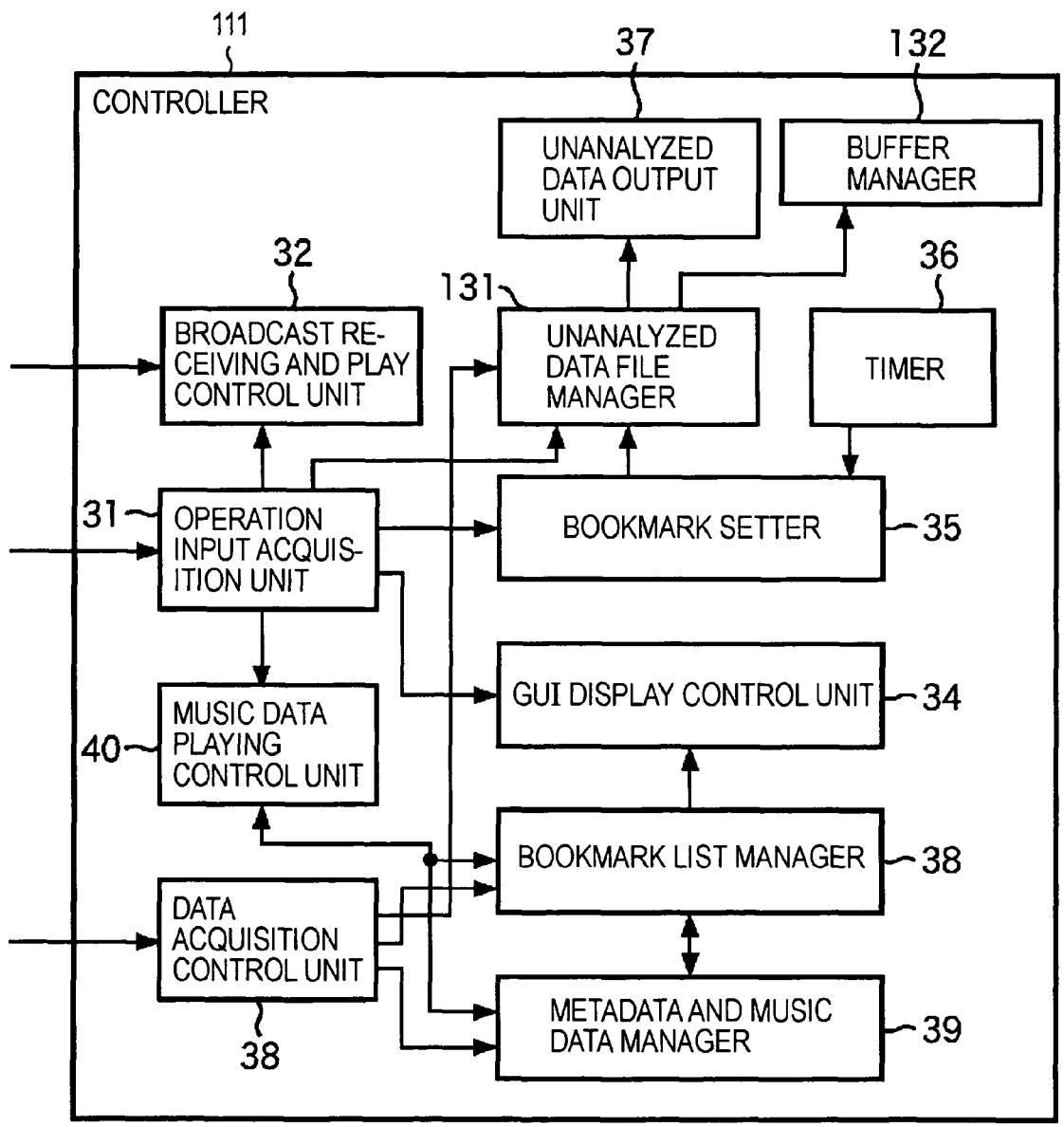
FIG. 14 is a functional block diagram illustrating the function of the controller of FIG. 13.

FIG. 14 is a functional block diagram illustrating a function of the controller 111 of the broadcast receiving terminal 101. As shown in FIG. 14, operation of the broadcast receiving terminal 101 is described below.

Elements identical to those described with reference to FIG. 3 are designated with the same reference numerals and the discussion thereof is omitted as appropriate.

The controller 111 in the broadcast receiving terminal 101 includes an unanalyzed data file manager 131 instead of the program memory 22. The controller 111 additionally includes a buffer manager 132. The other functions of the controller 111 are substantially identical to those of the controller 21 in the broadcast receiving terminal 1.

The unanalyzed data file manager 131 controls the buffer manager 132, thereby controlling recording of the broadcast signal received in broadcast receiving process and in the process of the broadcast receiving and play control unit 32 to the data buffer 112. When the bookmark setter 35 pre-registers the bookmark, the unanalyzed data file manager 131 controls recording of the broadcast signal buffered on the data buffer 112 onto the data memory 27. The unanalyzed data file manager 131 generates the unanalyzed data file based on the data recorded on the data memory 27. As the unanalyzed data file manager 33 records information, the unanalyzed data file manager 131 records the information such as the broadcasting station and the broadcast time to acquire the metadata used in the personal computer 51 when the information such as the broadcasting station and the broadcast time is used. The information used for the personal computer 51 to acquire the metadata may be information relating to a broadcast coverage area other than the information of the broadcasting station and the broadcast time. As necessary, the unanalyzed data file manager 131 obtains the information used for the personal computer 51 to acquire the metadata.

Under the control of the unanalyzed data file manager 131, the buffer manager 132 manages buffering of the broadcast signal received in the broadcast receiving process and the process of the broadcast receiving and play control unit 32, deletion of the buffered broadcast signal, and supplying of the buffered broadcast signal to the data memory 27.

The broadcast receiving terminal 101 receives a broadcast signal and pre-registers a bookmark in response to a user operation input as the broadcast receiving terminal 1 does. The broadcast receiving terminal 101 is then connected to the personal computer 51, thereby supplying to the personal computer 51 a unanalyzed data file and incidental information such as pre-registration information of the bookmark.

Figure 15:
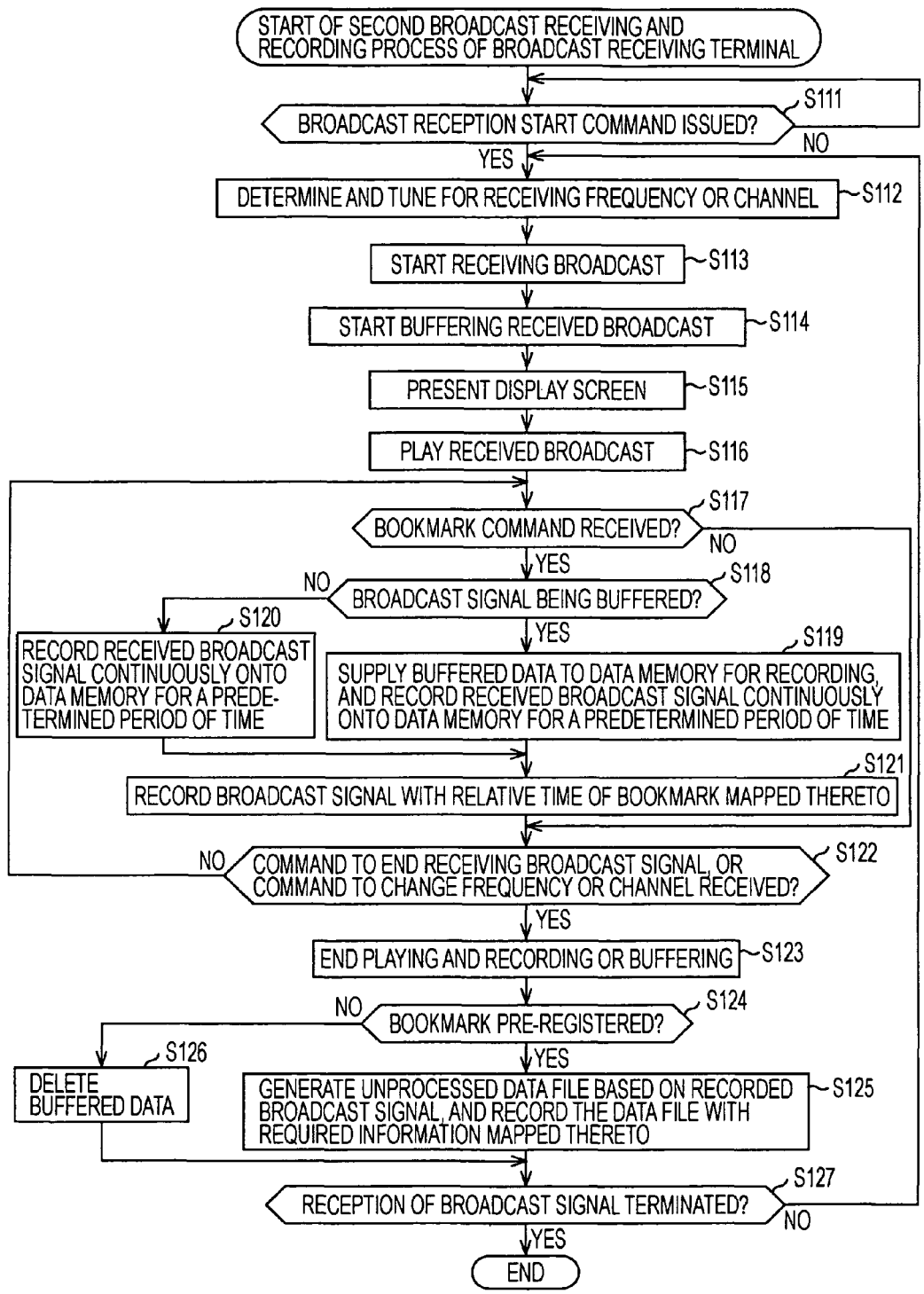
FIG. 15 is a flowchart illustrating a second broadcast receiving and recording process of the broadcast receiving terminal.

A second broadcast receiving and recording process performed by the broadcast receiving terminal 101 is described below with reference to a flowchart of FIG. 15.

Figure 10:
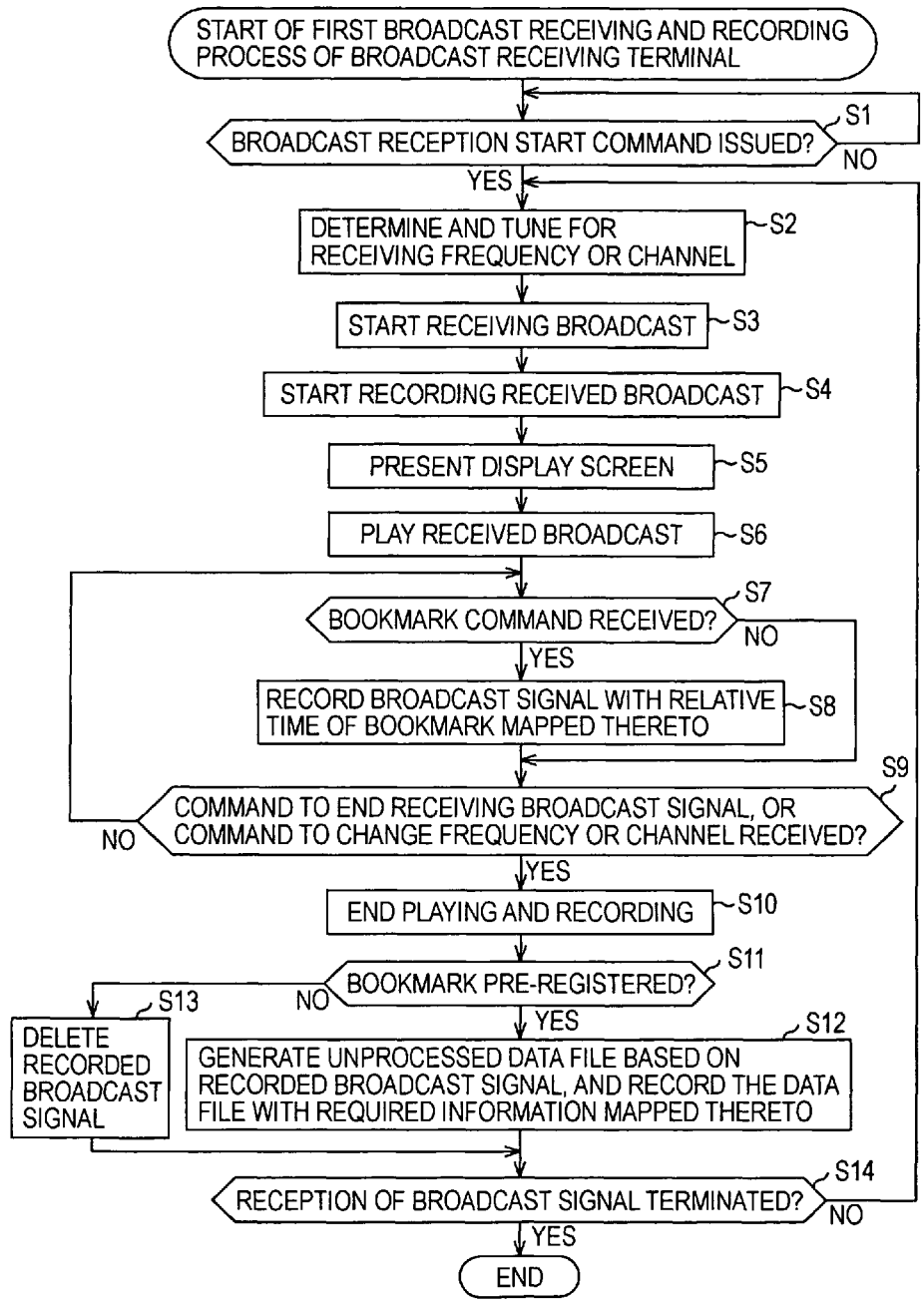
FIG. 10 is a flowchart illustrating a first broadcast receiving and recording process of the broadcast receiving terminal.

Steps S111 through S113 are respectively identical to steps S1 through S3 of FIG. 10.

The broadcast receiving terminal 101 determines whether a command to start receiving a broadcast signal has been received from the user. If it is determined that the command to start receiving the broadcast signal has been received, the broadcast receiving terminal 101 controls the tuner 25 to select the broadcast signal received via the antenna 24 and start receiving the broadcast signal.

In step S114, the unanalyzed data file manager 131 and the buffer manager 132 start recording the received broadcast signal on the data buffer 112. The bookmark setter 35 controls the bookmark setter 35 to start counting relative time.

Steps S115 through S117 are respectively identical to steps S5 through S7 of FIG. 10.

More specifically, as described with reference to FIG. 4, the broadcast receiving terminal 101 causes the display 11 to display a GUI notifying the user that the currently received broadcast signal is now played. The broadcast receiving terminal 101 controls the playback processor 26, thereby playing the received broadcast signal on the audio output unit 12 and the display 11. The broadcast receiving terminal 101 determines whether a bookmark command has been received from the user.

If it is determined in step S117 that the bookmark command has been received, processing proceeds to step S118. In step S118, the unanalyzed data file manager 131 and the buffer manager 132 determine whether the data buffer 112 buffers the received broadcast signal.

If it is determined in step S118 that the broadcast signal is currently buffered by the data buffer 112, processing proceeds to step S119. In step S119, the unanalyzed data file manager 131 and the buffer manager 132 supply the data buffered on the data buffer 112 to the data memory 27 for storage. The unanalyzed data file manager 131 continuously records the received broadcast signal on the data memory 27 for a predetermined period of time more long enough for one typical song, for example, for 5 minutes to 10 minutes. After the predetermined period of time, received broadcast signal is again supplied to the data buffer 112 for buffering.

If it is determined in step S118 that the broadcast signal is not buffered on the data buffer 112, in other words, it is determined that the broadcast signal is stored on the data memory 27, processing proceeds to step S120. In step S120, the unanalyzed data file manager 131 continuously records the received broadcast signal on the data memory 27 for a predetermined period of time more long enough for one typical song, for example, for 5 minutes to 10 minutes. After the predetermined period of time, the data buffer 112 starts buffering the received broadcast signal again.

Step S119 or S120 is followed by steps S121 and then S122, which are respectively identical to steps S8 and S9 discussed with reference to FIG. 10.

The bookmark setter 35 references the timer 36, thereby recording relative time responsive to the bookmark command with the currently recorded broadcast signal mapped thereto in step S121. The operation input acquisition unit 31 determines in step S122 whether one of commands to end broadcast reception and to change receiving frequency or receiving channel has been received from the user. If the operation input acquisition unit 31 determines in step S122 that one of commands to end broadcast reception and to change receiving frequency or receiving channel has been received from the user, processing returns to step S117 to repeat step S117 and subsequent steps.

If the operation input acquisition unit 31 determines in step S122 that one of commands to end broadcast reception and to change receiving frequency or receiving channel has been received from the user, processing proceeds to step S123. In step S123, the broadcast receiving and play control unit 32 controls the playback processor 26, thereby ending outputting of the played broadcast signal. The unanalyzed data file manager 33 and the buffer manager 132 complete the recording to the data memory 27 and the buffering to the data buffer 112.

In step S124, the unanalyzed data file manager 33 determines whether the bookmark setter 35 has pre-registered a bookmark on the broadcast signal recorded on the data memory 27.

If the unanalyzed data file manager 33 determines in step S124 that the bookmark has been pre-registered, processing proceeds to step S125. In step S125, the unanalyzed data file manager 33 attaches a predetermined file name to the broadcast signal recorded on the data memory 27, with the recording of broadcast signal starting in step S119 and, then ending after the predetermined period of time, or ending in step S123. The unanalyzed data file manager 33 thus generates an unanalyzed data file. The unanalyzed data file manager 33 records the generated unanalyzed data file with the pre-registered bookmark mapped thereto, and the information used to acquire the metadata mapped thereto. The information used to acquire the metadata includes information relating to the broadcasting station, the broadcast time, and the receiving location.

If the unanalyzed data file manager 33 determines in step S124 that no bookmark has been pre-registered, processing proceeds to step S126. In step S126, the buffer manager 132 deletes the broadcast signal buffered on the data buffer 112.

Subsequent to step S125 or step S126, the operation input acquisition unit 31 determines in step S127 whether the reception of the broadcast signal has been completed.

If it is determined in step S127 that the reception of the broadcast signal has not been completed, processing returns to step S112 to repeat step S112 and subsequent steps. If it is determined in step S127 that the reception of the broadcast signal has been completed, processing ends.

Through the above-described process, the broadcast signal is received, played and buffered. In response to the user operation input, the bookmark is pre-registered. The buffered data and the broadcast signal from the pre-registration of the bookmark to the end of the predetermined period of time are recorded. The predetermined file name is attached to the broadcast signal having undergone the pre-registration of the bookmark, and the unanalyzed data file is thus generated. The unanalyzed data file is recorded with the pre-registered bookmark mapped thereto and the information used to acquire the metadata (such as the broadcasting station, the broadcast time, and the receiving location) mapped thereto.

The broadcast receiving terminal 101 of this embodiment does not record all broadcast signal onto the data memory 27. The broadcast receiving terminal 101 records only the bookmark pre-registered broadcast signal on the data memory 27. The data memory 27 is larger in memory size than the data buffer 112, and consumes more power for operation. The broadcast receiving terminal 101 of this embodiment saves power more than the broadcast receiving terminal 1. Since only the data having undergone the bookmark pre-registration is stored on the data memory 27, a data memory 27 having a relatively small memory size in the broadcast receiving terminal 101 works.

In the same manner as described with reference to FIG. 11, the personal computer 51 analyzes the unanalyzed data file, the pre-registered bookmark, and the information used to acquire the metadata recorded on the broadcast receiving terminal 101. The personal computer 51 thus obtains the metadata. The information used to acquire the metadata includes information relating to the broadcasting station, the broadcast time, and the receiving location. In the same manner as described with reference to FIG. 12, the personal computer 51 transmits to the broadcast receiving terminal 101 the analyzed music data and metadata, and the updated bookmark list.

In the above-described process, one of the broadcast receiving terminal 1 and the broadcast receiving terminal 101 acquires the broadcast signal, and the personal computer 51 analyzes the broadcast signal in order to obtain the metadata. In contrast, the acquisition and analysis of the broadcast signal, and the acquisition of the metadata may be performed by a single apparatus.

Figure 16:
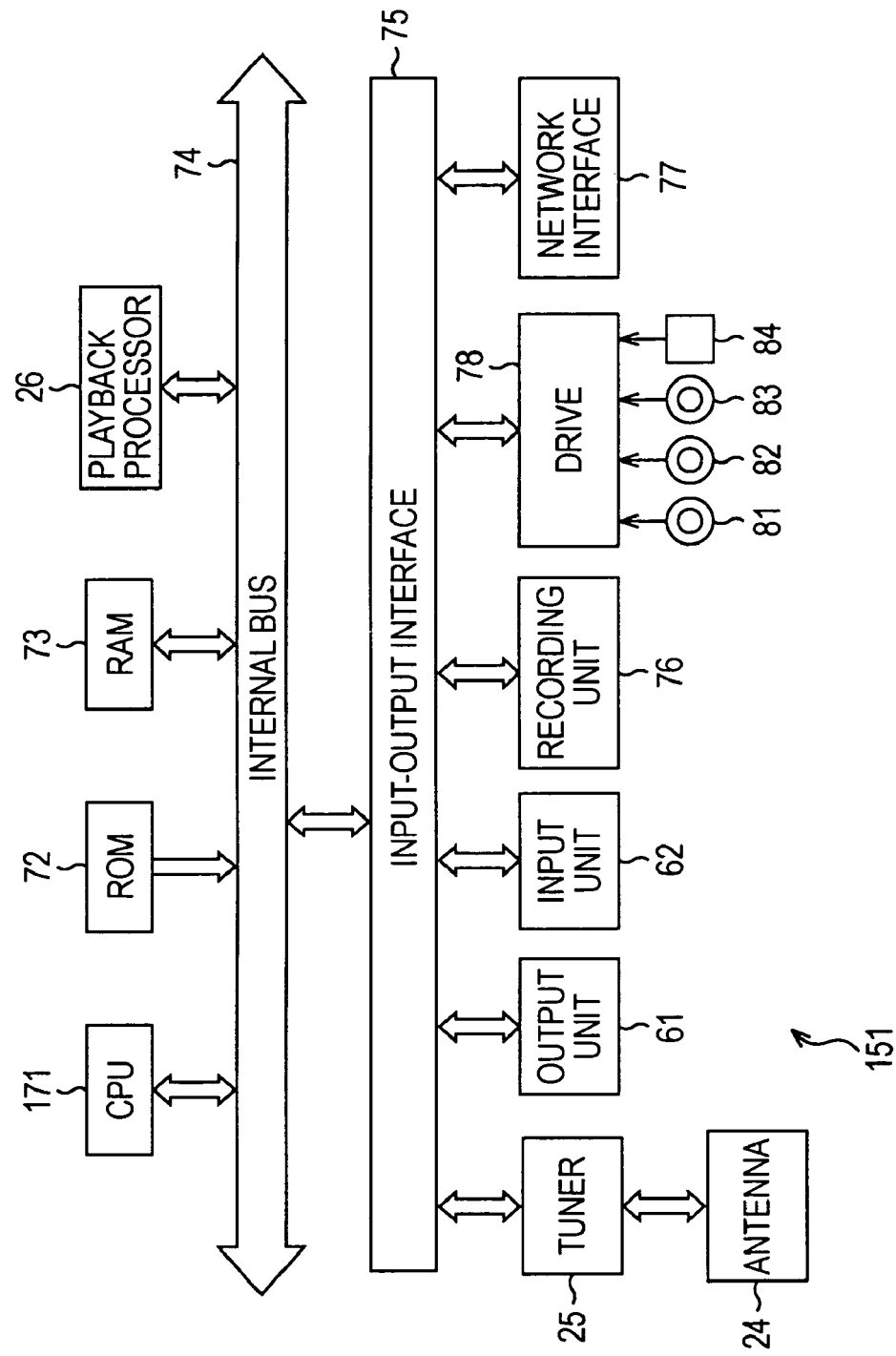
FIG. 16 is a block diagram illustrating a configuration of another personal computer.

FIG. 16 is a block diagram of a personal computer 151 of one embodiment of the present invention. The personal computer 151 acquires and analyzes the broadcast signal, and then acquires the metadata.

Elements identical to those described with reference to FIG. 8 are designated with the same reference numerals, and the discussion thereof is omitted herein. The external view of the personal computer 151 is basically identical to that of the personal computer 51 of FIG. 7, and is not shown herein.

The personal computer 151 of FIG. 16 includes a CPU 171 instead of the CPU 71. The personal computer 151 also includes a playback processor 26 identical in the counterpart in each of the broadcast receiving terminal 1 and the broadcast receiving terminal 101. The playback processor 26 is connected to an internal bus 74. The playback processor 26 is interconnected to other elements in the personal computer 151. Furthermore, the personal computer 151 includes an antenna 24 and a tuner 25 respectively identical to the counterparts in each of the broadcast receiving terminal 1 and the broadcast receiving terminal 101. The antenna 24 and the tuner 25 are connected to an input-output interface 75. The rest of the personal computer 151 is substantially identical in structure to the personal computer 51.

The CPU 171 executes a variety of processes under the control of a program stored on a ROM 72 or a program loaded from a recording unit 76 such as HDD to a RAM 73.

The antenna 24 receives a radio broadcasting wave or a television broadcasting wave.

The tuner 25 selects one of the radio broadcasting wave and the television broadcasting wave received by the antenna 24 under the control of the CPU 171.

Under the control of the CPU 171, the playback processor 26 reproduces a broadcast signal received and selected by the tuner 25. More specifically, the playback processor 26 demodulates a received signal, and performs one of a descrambling process and a decoding process on the received signal, thereby reproducing the broadcast signal.

Figure 17:
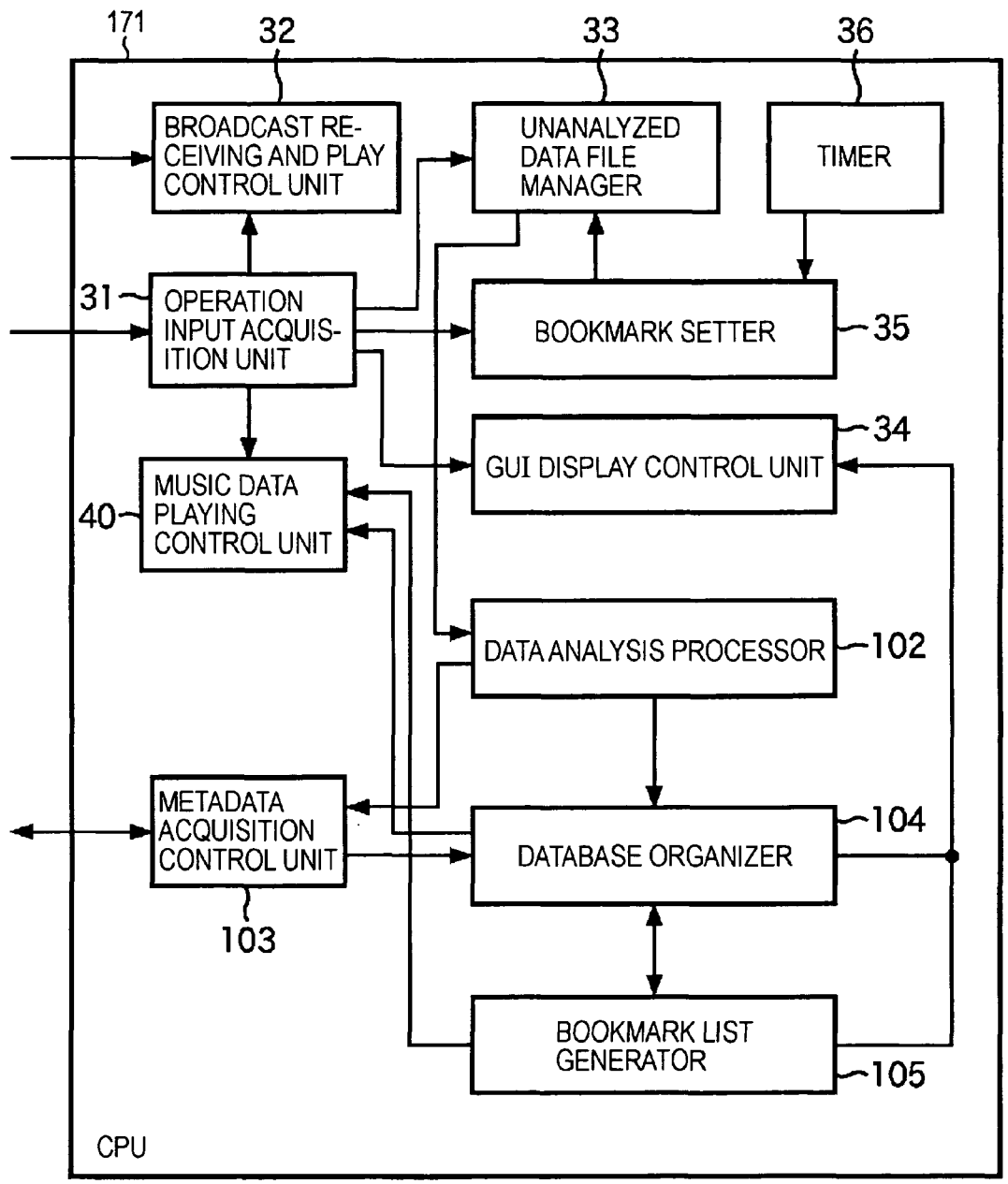
FIG. 17 is a functional block diagram illustrating a function of the CPU of FIG. 16.

FIG. 17 is a functional block diagram of the CPU 171 of the personal computer 151. As shown in the functional block diagram, the CPU 171 performs applications to receive a broadcast signal, analyze the received broadcast signal, acquire metadata to organize a database, and generate a bookmark list.

Elements identical to those described with reference to FIGS. 3 and 9 are designated with the same reference numerals, and the discussion thereof is omitted herein as appropriate.

The CPU 171 performs applications to receive a broadcast signal, analyze the received broadcast signal, acquire metadata to organize a database, and generate a bookmark list. The CPU 171 performing the applications has substantially the same function as discussed with reference to FIGS. 3 and 9. In other words, the CPU 171 includes the operation input acquisition unit 31, the broadcast receiving and play control unit 32, the unanalyzed data file manager 33, the GUI display control unit 34, the bookmark setter 35, the timer 36, the music data playing control unit 40 as described with reference to FIG. 3, and the data analysis processor 102, the metadata acquisition control unit 103, the database organizer 104, and the bookmark list generator 105 as described with reference to FIG. 9.

Operation using these functions is described below.

When the user issues a command to receive the broadcast signal, the broadcast receiving and play control unit 32 controls the tuner 25, thereby selecting the broadcasting station previously selected at the end of the last operation or a predetermined broadcasting station selected by the operation input acquisition unit 31 in response to a user operation input. The broadcast receiving and play control unit 32 also controls the tuner 25, thereby supplying the broadcast signal received by the antenna 24 to the playback processor 26 for demodulation. If the received broadcast signal is a radio broadcast program, the broadcast receiving and play control unit 32 supplies a reproduced audio signal to the loudspeaker 61-2 of the output unit 61 for sound output. The unanalyzed data file manager 33 also supplies the reproduced audio signal to the recording unit 76 for storage.

As shown in FIG. 4, the GUI display control unit 34 causes the display 61-1 in the output unit 61 to display information relating to the radio broadcast program currently being output. If the received broadcast signal is a television broadcast program, the broadcast receiving and play control unit 32 supplies the reproduced audio signal to the loudspeaker 61-2 in the output unit 61 for sound output. The broadcast receiving and play control unit 32 also outputs a reproduced video signal to the display 61-1 in the output unit 61 for displaying. The unanalyzed data file manager 33 supplies the reproduced audio and video signals to the internal bus 74 for storage. In the same manner as described with reference to FIG. 4, the GUI display control unit 34 causes the display 61-1 in the output unit 61 to display information relating to the television program currently output in a manner such that the displayed information may not hide the displayed video. The bookmark setter 35 controls the timer 36, thereby counting the relative time from the start of the recording of the broadcast signal onto the recording unit 76.

If the operation input acquisition unit 31 receives any of commands for re-winding, fast-forwarding, pause operations, the broadcast receiving and play control unit 32 reads the broadcast signal recorded on the recording unit 76 in response to the user operation input, and supplies the read broadcast signal to one of the display 61-1 and the loudspeaker 61-2 in the output unit 61. The unanalyzed data file manager 33 continuously supplies the broadcast signal received on a real-time basis to the recording unit 76 for storage.

When the operation input acquisition unit 31 receives an operation input for a bookmark command, the bookmark setter 35 references the timer 36, and records the relative time information at the time point of the bookmark operation input from the start of the broadcast reception. This operation is referred to a bookmark pre-registration.

The GUI display control unit 34 causes the display 61-1 in the output unit 61 to display a message notifying the user of the reception of the bookmark command. The message is something like the one illustrated in FIG. 5.

The operation input acquisition unit 31 may receive an operation input such as one of operation commands for turning, changing the broadcasting station or the receiving channel, and for ending the broadcast reception. The unanalyzed data file manager 33 then performs different processes depending on whether the bookmark has been pre-registered or not. If the broadcast signal is recorded on the recording unit 76 with the relative time information with respect to the broadcast receiving start point mapped thereto, a unique file name is attached to the recorded broadcast signal based on file generation time, the name of the broadcasting station, etc. The unanalyzed data file thus generated is stored with the relative time information of the bookmark recorded by the bookmark setter 35 mapped thereto. The broadcast signal recorded on the recording unit 76 with the relative time information with respect to the broadcast reception start mapped thereto means that the bookmark is pre-registered. A plurality of pieces of the pre-registration information of bookmark as the relative time information may be mapped to a single file.

The unanalyzed data file manager 33 obtains the information used for the personal computer to acquire the metadata, and stores the obtained information together with the unanalyzed data file. The information used to acquire the metadata includes information relating to the broadcasting station and the broadcast time.

Each time the operation input such as one of commands for tuning, changing the broadcasting station or the receiving channel, and ending the broadcast reception is received, the unanalyzed data file manager 33 determines whether at least one bookmark has been pre-registered. The unanalyzed data file manager 33 generates an unanalyzed data file for a broadcast signal having at least one bookmark pre-registered. The unanalyzed data file manager 33 can thus generate a plurality of unanalyzed data files.

The data analysis processor 102 reads the audio unanalyzed data file or the video unanalyzed data file managed by the unanalyzed data file manager 33, and the pre-registration information of the bookmark mapped thereto from the recording unit 76. The data analysis processor 102 also reads the information relating to the broadcast signal and the broadcast time managed by the unanalyzed data file manager 33 from the recording unit 76 as necessary. The data analysis processor 102 analyzes the unanalyzed data file read from the recording unit 76, discriminates between the music portion and the other portion such as a conversation of an announcer, and extracts only the music portion. Using the analysis technique disclosed in Japanese Unexamined Patent Application Publication No. 2005-274708, the data analysis processor 102 may discriminate between the music portion and the other portion based on the feature quantity such as tempo and sense of speed of a song. The data analysis processor 102 extracts or analyzes the information used to acquire the metadata, and then supplies the extracted information to the metadata acquisition control unit 103.

If the metadata is acquired by transmitting a portion of the music data to a predetermined server performing search service, the data analysis processor 102 extracts the portion of the music data to be transmitted to the predetermined server. The data analysis processor 102 extracts a feature quantity of a song to be used in the search process, supplies the feature quantity to the metadata acquisition control unit 103 to transmit the extracted feature quantity of the song to the predetermined server to extract the metadata. If the information of the broadcasting station and the broadcast time is used to acquire the metadata, the data analysis processor 102 acquires the broadcasting station and the broadcast time.

The metadata acquisition control unit 103 transmits the portion of the song or the feature quantity of the song for use in the search process to the predetermined server via the internal bus 74, the input-output interface 75 and the network interface 77. The predetermined server provides the search service based on the portion of the music data. The metadata acquisition control unit 103 supplies the metadata received via the network interface 77 to the recording unit 76. The broadcast receiving terminal 101 supplies the information regarding the broadcasting station and the broadcast time to the predetermined server that provides the search service based on the information regarding the broadcasting station and the broadcast time. The metadata acquisition control unit 103 then supplies the metadata received via the network interface 77 to the recording unit 76.

The database organizer 104 maps the bookmarked music data analyzed by the data analysis processor 102 to the metadata corresponding to the music data acquired by the metadata acquisition control unit 103, and then stores the bookmarked music data and the metadata on the recording unit 76, thereby organizing a database of songs.

The bookmark list generator 105 generates a bookmark list that indicates a map between the database organized by the database organizer 104 and the bookmark input by the user. The bookmark list generator 105 transmits the generated bookmark list to the recording unit 76 for storage via the internal bus 74, and the input-output interface 75. This process is the bookmark registration process.

Based on the bookmark list recorded on the recording unit 76, the GUI display control unit 34 completes the registration of the bookmark in response to the user operation input as previously discussed with reference to FIG. 6. A list of the music data playable in response to the user selection is displayed on the display 61-1 in the output unit 61. In the case of the music data with the metadata thereof obtained, the title of the song and the artist name contained in the metadata are also displayed. When the user selects desired data from the list of music data playable in the playing process and issues a command to play the desired data, the music data playing control unit 40 references the bookmark generated by the bookmark list generator 105, and reads the corresponding music data from the recording unit 76. The read music data is output to the loudspeaker 61-2 in the input unit 62 for playing. If the metadata is mapped to the video data, the video data is output to the display 61-1 in the output unit 61 in synchronization with the audio output. If the music data with the video data mapped thereto is recorded, the recorded broadcast signal may be a television broadcast program.

In accordance with this embodiment, the personal computer 151 has no buffer for temporarily storing the broadcast signal. The personal computer 151 may include a buffer similar to the data buffer 112 in the broadcast receiving terminal 101 previously discussed with reference to FIG. 13. In such a case, the personal computer 151 can temporarily store the received broadcast signal on the buffer. When a bookmark pre-registration is requested by the user, the personal computer 151 may supply the buffered broadcast signal and the broadcast signal received thereafter for a subsequent predetermined period of time to the recording unit 76 for storage.

A process of the personal computer 151 is described below with reference to flowcharts of FIGS. 18 and 19.

Figure 18:
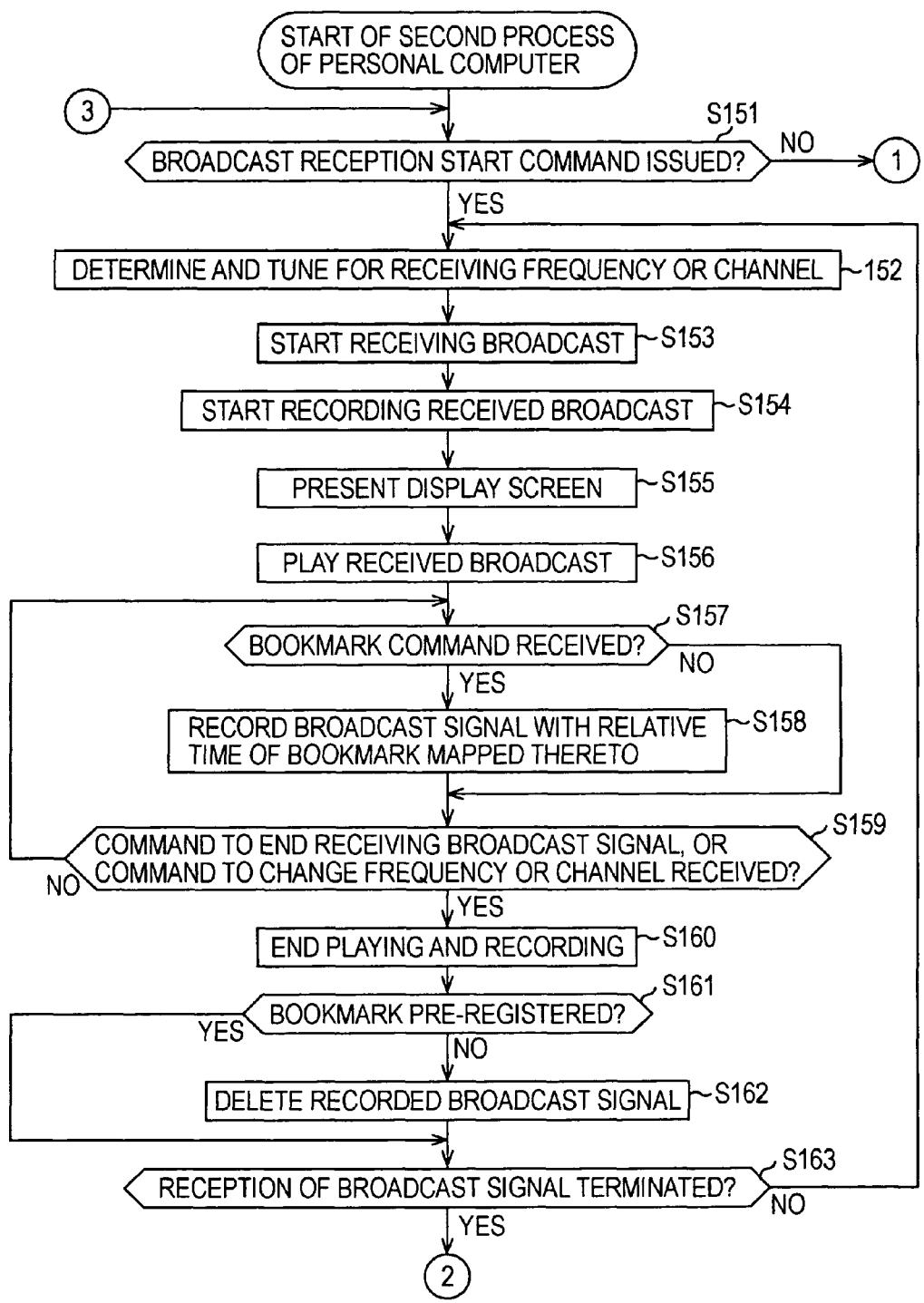
FIG. 18 is a flowchart illustrating a second process of the personal computer.
Figure 19:
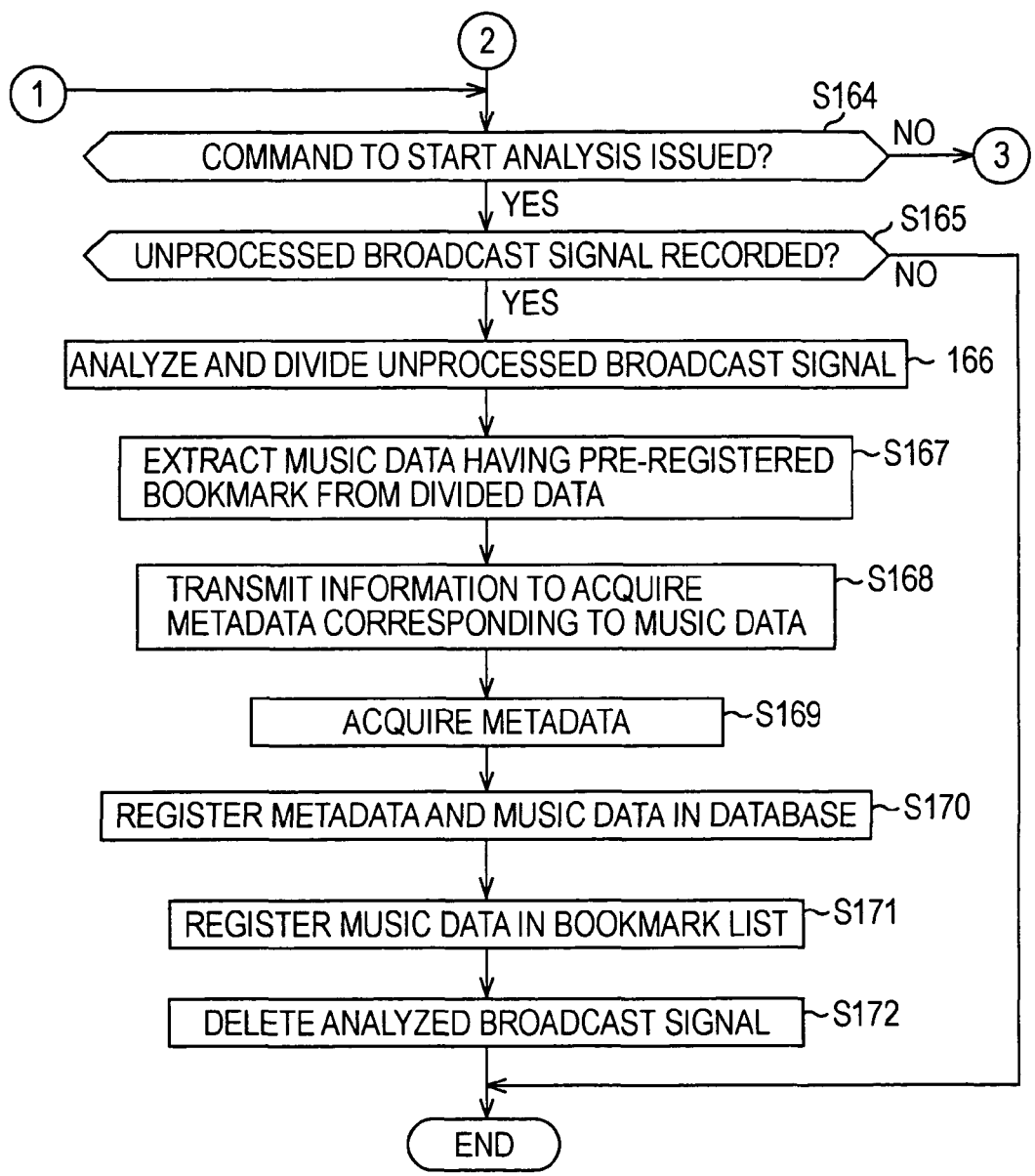
FIG. 19 is a continuation of the flowchart of FIG. 18.

Steps S151 through S160 of FIG. 18 are identical to steps S1 through S10 of FIG. 10, respectively.

More specifically, the operation input acquisition unit 31 discussed with reference to FIG. 17 may now determine that a broadcast reception start command has been issued from the user. The broadcast receiving and play control unit 32 determines a receiving frequency or a receiving channel, controls the tuner 25 to tune for a received broadcast signal, and controls the antenna 24 and the tuner 25, thereby starting the broadcast reception.

The unanalyzed data file manager 33 start recording the received broadcast signal on the recording unit 76. The bookmark setter 35 controls the timer 36, thereby starting counting relative time.

The GUI display control unit 34 controls the display 61-1 in the output unit 61, thereby presenting a GUI display screen to notify the user that the currently received broadcast signal is now played as previously discussed with reference to FIG. 4. The broadcast receiving and play control unit 32 controls the playback processor 26, thereby causing the loudspeaker 61-2 in the output unit 61 and, if necessary, the display 61-1 in the output unit 61 to output the received broadcast signal.

When the operation input acquisition unit 31 determines that the user has issued a bookmark command, the bookmark setter 35 references the timer 36, thereby continuously recording the broadcast signal with the relative time at the bookmark command mapped thereto.

If the operation input acquisition unit 31 determines that any of commands to end the broadcast reception and to change the receiving frequency or the receiving channel has not been issued, processing returns to step S157 to repeat step S157 and subsequent steps. If the operation input acquisition unit 31 determines that one of commands to end the broadcast reception and to change the receiving frequency or the receiving channel has been issued, the broadcast receiving and play control unit 32 controls the playback processor 26 to end the playing of the received broadcast signal. The unanalyzed data file manager 33 ends the recording of the received broadcast signal to the recording unit 76.

In step S161, the unanalyzed data file manager 33 determines whether the bookmark setter 35 has pre-registered the bookmark on the broadcast signal recorded on the recording unit 76.

If the unanalyzed data file manager 33 determines in step S161 that the bookmark has not been pre-registered, processing proceeds to step S162. In step S162, the unanalyzed data file manager 33 deletes the broadcast signal recorded on the recording unit 76.

If the unanalyzed data file manager 33 determines in step S161 that the bookmark has been pre-registered, or subsequent to step S162, processing proceeds to step S163. In step S163, the operation input acquisition unit 31 determines whether the reception of the broadcast signal has been completed.

If it is determined in step S163 that the reception of the broadcast signal has not been completed, processing returns to step S152 to repeat step S152 and subsequent steps. If it is determined in step S163 that the reception of the broadcast signal has been completed, the operation input acquisition unit 31 determines in step S164 whether a command to start the analysis process has been issued.

If the operation input acquisition unit 31 determines in step S164 that the command to start the analysis process has not been issued, processing returns to step S151 to repeat step S151 and subsequent steps.

If the operation input acquisition unit 31 determines in step S164 that the command to start the analysis process has been issued, processing proceeds to step S165. In step S165, the data analysis processor 102 determines whether an unprocessed broadcast signal is recorded on the recording unit 76. If the data analysis processor 102 determines that no unprocessed broadcast signal is recorded, processing ends.

If the broadcast receiving terminal 101 determines in step S165 that an unprocessed broadcast signal is recorded, processing proceeds to step S166. In step S166, the data analysis processor 102 analyzes the unprocessed broadcast signal using the analysis method disclosed in Japanese Unexamined Patent Application Publication No. 2005-274708, and divides the unprocessed broadcast signal between the music portion and the other portion.

Figure 11:
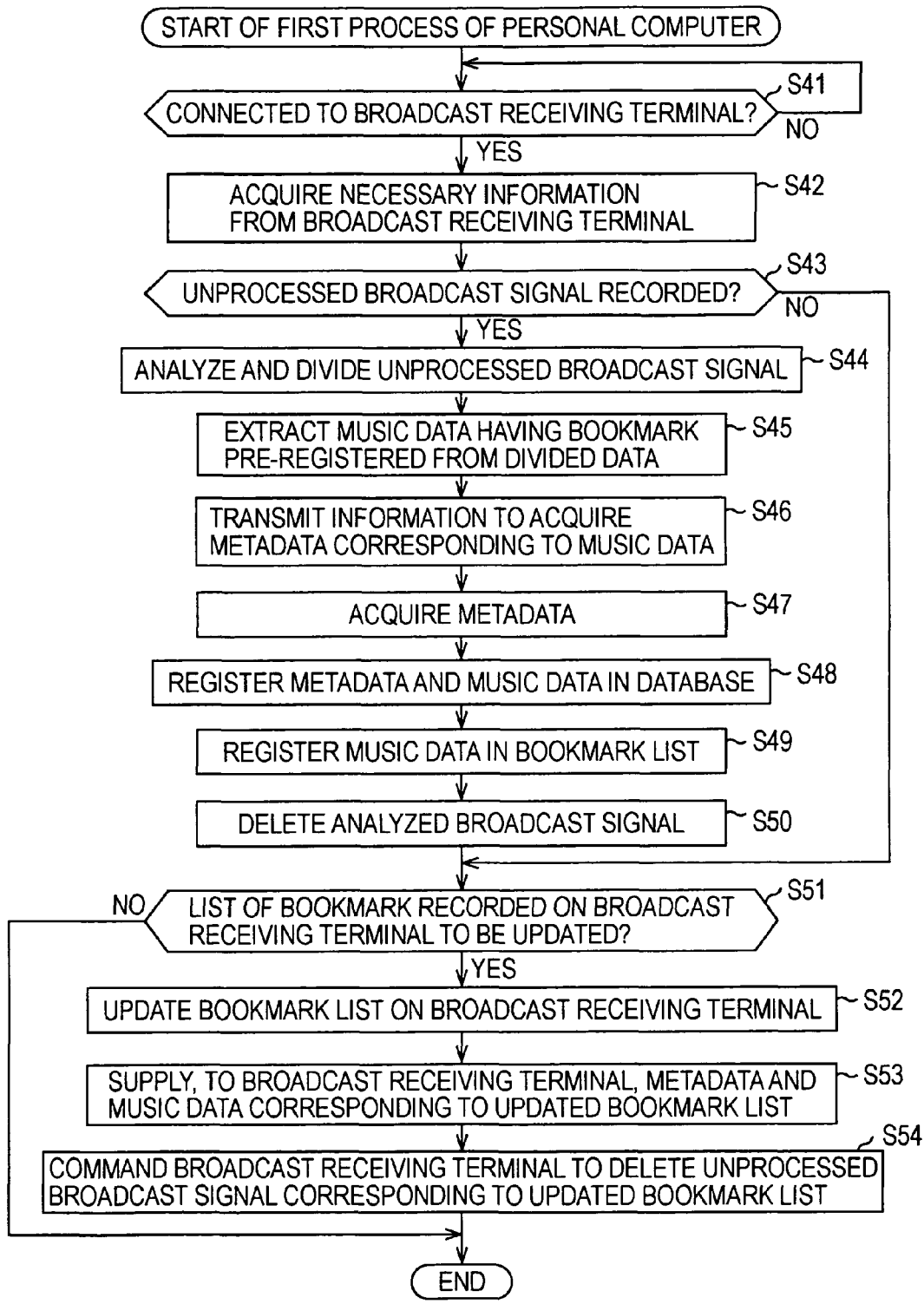
FIG. 11 is a flowchart illustrating a first process of the personal computer.
Figure 12:
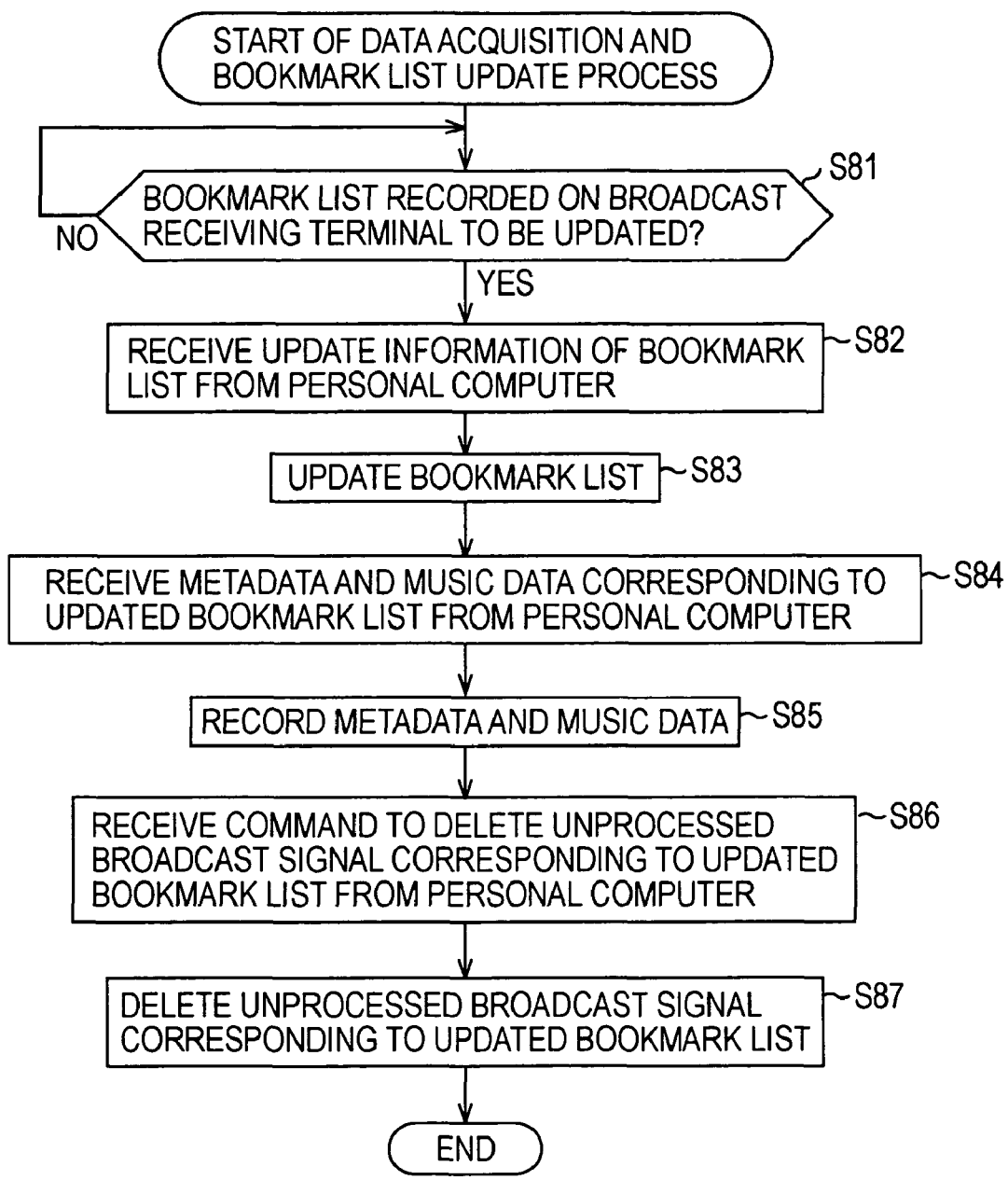
FIG. 12 is a flowchart illustrating a data acquisition and bookmark list update process.

Steps S167 through S172 are substantially identical to steps S45 through S50 of FIG. 11, respectively.

More specifically, the data analysis processor 102 extracts from among the divided data the bookmark pre-registered music data, namely, the music data being played at the moment the user provides the bookmark command. The data analysis processor 102 extracts the information used to acquire the metadata of the divided and extracted music data, and then supplies the extracted information to the metadata acquisition control unit 103. The information used to acquire the metadata includes information relating to a portion of a song, feature quantity data of the portion of the song, the broadcasting station broadcasting the song, the broadcast time at which the song is broadcast, the broadcast coverage area, etc.

The metadata acquisition control unit 103 transmits to the predetermined server the information used to acquire the metadata via the internal bus 74, the input-output interface 75, and the network interface 77. The predetermined server provides the search service in response to the portion of the music data. The metadata acquisition control unit 103 supplies the metadata received via the network interface 77 to the recording unit 76.

The database organizer 104 maps the music data obtained through the analysis by the data analysis processor 102 to the metadata corresponding to the music data acquired by the metadata acquisition control unit 103 and then registers the music data and the metadata to the database. If the received broadcast signal is a television broadcast signal, the video data is also recorded onto the database together with the music data.

The bookmark list generator 105 registers the music data, registered in the database, into the bookmark list recorded on the recording unit 76. In other words, the bookmark list generator 105 performs the bookmark registration. The data analysis processor 102 deletes the analyzed broadcast signal and processing ends.

Through the above-described process, the personal computer 151 alone receives the broadcast signal, analyzes the received broadcast signal, acquires the metadata to organize the database and generates the bookmark list.

In accordance with embodiments of the present invention, the broadcast signal is received, the received data of the signal is analyzed to extract the music data with the bookmark set by the user. The metadata corresponding to the extracted song is acquired to organize the database and the bookmark list is generated. If the user likes a song in a broadcast program, the use simply issues a bookmark command to accumulate the music data. The music data of the songs are acquired and the database of the songs is automatically organized. The user can thus enjoy playing the songs.

In accordance with embodiments of the present invention, the music data accumulated by the user is not music data distributed by content service providers but broadcast music data. The metadata of the music data is accumulated, and the music data and the metadata are organized into the database. The bookmark list that is link information between the music data and the metadata is also generated. By referencing the bookmark list, the user selects a desired song. In the middle of program broadcasting or program record and playing, the user can play any song the user likes.

If the broadcast signal, like a television broadcast program, contains not only an audio signal but also a video signal, video is also accumulated together with the music data. The user can thus accumulate favorite music clips.

The present invention is applicable as long as information including at least music data is acquired. The present invention is applicable when a wire broadcast program or a cable television broadcast program is acquired via a wired link, or when a variety of contents is provided via the Internet.

In accordance with embodiments of the present invention, a broadcast program is received using two apparatuses or one apparatus, received data is analyzed in response to the user set bookmark, metadata is acquired to organize a database, and a bookmark list is generated. The function of the apparatus may be divided among a plurality of apparatuses, or a process of one of the embodiments of the present invention may be performed by another apparatus that has some other function.

The above-described series of process steps may be executed using software. If the series of process steps is performed using software, a program constructing the software may be installed onto a computer in a dedicated hardware structure. The program may be installed from a recording medium to a general-purpose personal computer. The program may be installed from a recording medium to a general-purpose computer from a server via the Internet. The functional blocks of FIGS. 3, 9, 14, and 17 may be embodied using hardware. In this case, the series of process steps may be performed using hardware.

As shown in FIGS. 8 and 16, the recording media may include package media distributed to provide the user with the program separate from the computer. The package media include a magnetic disk 81 such as a flexible disk, an optical disk 82 such as compact disk read-only memory (CD-ROM) or digital versatile disk (DVD), a magneto-optical disk 83 such as Mini-Disk (MD®), and a semiconductor memory 84.

The process steps describing the program stored on the recording medium may be performed in the order sequence as described. The process steps may not necessarily be performed in the described order sequence, but may be performed in parallel or individually.

The system in the context of the specification refers to an entire system including a plurality of apparatuses.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing system comprising a first apparatus for acquiring first data containing at least audio data and a second apparatus for exchanging information with the first apparatus, wherein the first apparatus includes:
  a data acquisition unit for acquiring the first data;
  a recording unit for recording the first data;
  an output unit for outputting the first data;
  an operation input acquisition unit for acquiring an operation input;
  a setting unit for setting bookmark information mapped to the first data, the bookmark information indicating a position of the first data that is output from the output unit at the moment the operation input acquisition unit acquires the operation input; and
  a first supplying controller for controlling supplying of the first data and the bookmark information to the second apparatus, and wherein the second apparatus includes:
  a first acquisition controller for controlling acquisition of the first data and the bookmark information;
  an analyzer for extracting a music portion of the first data by analyzing the first data, and extracting, as second data, part of the music portion of the first data with the bookmark information mapped thereto;
  a second acquisition controller for controlling acquisition of metadata corresponding to the second data; and
  a recording controller for controlling recording of the second data and the metadata with the second data mapped to the metadata.

2. The information processing system according to claim 1, wherein the second apparatus further comprises a link information generator for generating link information linking the second data and the metadata.

3. The information processing system according to claim 2, wherein the second apparatus further comprises a second supplying controller for controlling supplying of the second data, the metadata, and the link information to the first apparatus.

4. The information processing system according to claim 3, wherein the first apparatus further comprises:
  a third acquisition controller for controlling acquisition of the second data, the metadata, and the link information;
  a link information recording controller for controlling recording of the link information;

an information recording controller for controlling recording of the second data and the metadata; and
a playing controller for controlling playing of the second data.

5. The information processing system according to claim 1, wherein the first apparatus further comprises:
a storage unit for storing the first data for a predetermined period of time; and
an analysis information recording controller for controlling the recording unit to start to record the first data at the moment the operation input acquisition unit acquires the operation input and continue to record the first data for a predetermined period of time.

6. The information processing system according to claim 1, wherein the bookmark information comprises relative time information from the start of the recording of the first data.

7. The information processing system according to claim 1, wherein the bookmark information comprises flag information indicating the position of the first data that is output by the output unit at the moment the operation input acquisition unit acquires the operation input.

8. The information processing system according to claim 1, wherein the second acquisition controller in the second apparatus controls supplying of information containing a feature quantity of a portion of the second data to a predetermined server while controlling acquisition of metadata corresponding to the second data from the server.

9. The information processing system according to claim 1, wherein the second acquisition controller in the second apparatus controls supplying of information containing a portion of the second data to a predetermined server while controlling acquisition of metadata corresponding to the second data from the server.

10. The information processing system according to claim 1, wherein the second acquisition controller in the second apparatus controls supplying of information containing broadcast time information of the second data to a predetermined server while controlling acquisition of metadata corresponding to the second data from the server.

11. The information processing system according to claim 1, wherein the second acquisition controller in the second apparatus controls supplying of information containing broadcasting station information of the second data to a predetermined server while controlling acquisition of metadata corresponding to the second data from the server.

12. The information processing system according to claim 1, wherein the second acquisition controller in the second apparatus controls supplying of information containing information relating to a broadcast coverage area of the second data to a predetermined server while controlling acquisition of metadata corresponding to the second data from the server.

13. An information processing method of an information processing system comprising a first apparatus for acquiring first data containing at least audio data and a second apparatus for exchanging information with the first apparatus, the method comprising:
through the first apparatus,
a data acquisition step of acquiring the first data;
a recording step of recording the first data acquired in the data acquisition step;
an output step of outputting the first data acquired in the data acquisition step;
an operation input acquisition step of acquiring an operation input when the first data is output in the output step;
a bookmark information setting step of setting bookmark information mapped to the first data, the bookmark information indicating a position of the first data that is output in the output step at the moment the operation input is acquired in the operation input acquisition step; and
a supply step of supplying to the second apparatus the first data and the bookmark information with the first data and the bookmark information mapped to each other in the bookmark information setting step, and through the second apparatus,
a data acquisition step of acquiring the first data and the bookmark information from the first apparatus, the bookmark information representing a timing at which the first apparatus receives the operation input during the output of the first data;
an analyzing step of extracting a music portion of the first data by analyzing the first data acquired in the data acquisition step, and extracting, as second data, part of the music portion of the first data with the bookmark information mapped thereto;
a metadata acquisition step of acquiring metadata corresponding to the second data analyzed and extracted in the analyzing step; and
a recording step of recording the analyzed and extracted second data and the acquired metadata with the second data mapped to the metadata.

14. An information processing apparatus comprising:
a data acquisition unit for acquiring data containing at least audio data;
a recording unit for recording the data;
an output unit for outputting the data;
an operation input acquisition unit for acquiring an operation input when the output unit outputs the data;
a setting unit for setting bookmark information mapped to the data, the bookmark information indicating a time position of the data relative to a start of the recording of the data that is output from the output unit at the moment the operation input acquisition unit acquires the operation input; and
a supplying controller for controlling supplying of the data and the bookmark information to another apparatus.

15. A recording medium storing a computer program, the computer program, when executed by a processor, directing the processor to perform:
a data acquisition step of acquiring the first data containing at least audio data;
a recording step of recording the first data acquired in the data acquisition step;
an output step of outputting the first data acquired in the data acquisition step;
an operation input acquisition step of acquiring an operation input when the first data is output in the output step;
a bookmark information setting step of setting bookmark information mapped to the first data, the bookmark information indicating a time position of the first data relative to a start of the recording of the first data that is output in the output step at the moment the operation input is acquired in the operation input acquisition step; and
a supply step of supplying to the second apparatus the first data and the bookmark information with the first data and the bookmark information mapped to each other in the bookmark information setting step.

16. An information processing apparatus comprising:
a first acquisition controller for controlling acquisition of first data acquired by another apparatus and containing at least audio data, and bookmark information as information indicating a time position of the first data relative to a start of a recording of the first data;

an analyzer for extracting a music portion of the first data by analyzing the first data, and extracting, as second data, part of the music portion of the first data with the bookmark information mapped thereto;

a second acquisition controller for controlling acquisition of metadata corresponding to the second data; and a recording controller for controlling recording of the second data and the metadata with the second data mapped thereto.

17. A recording medium storing a computer program, the computer program, when executed by a processor, directing the processor to perform:

a data acquisition step of controlling acquisition of first data supplied by another apparatus, and bookmark information as information indicating a time position of the first data relative to a start of recording of the first data;

an analysis step of extracting a music portion of the first data acquired in the data acquisition step by analyzing the first data, and extracting, as second data, part of the music portion of the first data with the bookmark information mapped thereto;

a metadata acquisition step of controlling acquisition of metadata corresponding to the second data that is analyzed and extracted in the analysis step; and a recording step of controlling recording of the analyzed and extracted second data and the acquired metadata with the second data mapped to the metadata.

18. An information processing apparatus comprising:

a data acquisition unit for acquiring first data containing at least audio data;

a recording unit for recording the first data;

an output unit for outputting the first data;

an operation input acquisition unit for acquiring an operation input when the output unit outputs the first data;

a setting unit for setting bookmark information mapped to the first data, the bookmark information indicating a time position of the first data relative to a start of the recording of the first data that is output from the output unit at the moment the operation input acquisition unit acquires the operation input;

an analyzer for extracting a music portion of the first data by analyzing the first data, and extracting, as second data, part of the music portion of the first data with the bookmark information mapped thereto;

an acquisition controller for controlling acquisition of metadata corresponding to the second data; and a recording controller for controlling recording of the second data and the metadata with the second data mapped to the metadata.

19. A recording medium storing a computer program, the computer program comprising:

a data acquisition step of acquiring first data containing at least audio data;

a recording step of recording the first data acquired in the data acquisition step;

an output step of outputting the first data acquired in the data acquisition step;

an operation input acquisition step of acquiring an operation input in response to the outputting of the first data in the output step;

a bookmark information setting step of setting bookmark information mapped to the first data, the bookmark information indicating a time position of the first data relative to a start of the recording of the first data that is output at the moment the operation input is acquired in the operation input acquisition step;

an analyzing step of extracting a music portion of the first data by analyzing the first data, and extracting, as second data, part of the music portion of the first data with the bookmark information mapped thereto in the bookmark information setting step;

a metadata acquisition step of controlling acquisition of metadata corresponding to the second data analyzed and extracted in the analyzing step; and an analysis data recording step of controlling recording of the second data analyzed and extracted in the analyzing step and the metadata acquired in the metadata acquisition step with the second data mapped to the metadata.

20. An information processing system comprising a first apparatus for acquiring first data containing at least audio data and a second apparatus for exchanging information with the first apparatus, wherein the first apparatus includes:
data acquisition means for acquiring the first data;
recording means for recording the first data;
output means for outputting the first data;
operation input acquisition means for acquiring an operation input;
setting means for setting bookmark information mapped to the first data, the bookmark information indicating a position of the first data that is output from the output means at the moment the operation input acquisition means acquires the operation input; and
first supplying controller means for controlling supplying of the first data and the bookmark information to the second apparatus, and wherein the second apparatus includes:
first acquisition controller means for controlling acquisition of the first data and the bookmark information;
analyzer means for extracting a music portion of the first data by analyzing the first data, and extracting, as second data, part of the music portion of the first data with the bookmark information mapped thereto;
second acquisition controller means for controlling acquisition of metadata corresponding to the second data; and
recording controller means for controlling recording of the second data and the metadata with the second data mapped to the metadata.

* * * * *